United States Patent
Bonnier et al.

(10) Patent No.: US 10,120,267 B2
(45) Date of Patent: Nov. 6, 2018

(54) SYSTEM AND METHOD FOR RE-CONFIGURING A LIGHTING ARRANGEMENT

(71) Applicant: CANON KABUSHIKI KAISHA, Tokyo (JP)

(72) Inventors: Nicolas Pierre Marie Frederic Bonnier, Neutral Bay (AU); Geoffrey John Woolfe, Umina Beach (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 159 days.

(21) Appl. No.: 14/715,396

(22) Filed: May 18, 2015

(65) Prior Publication Data

US 2015/0338722 A1    Nov. 26, 2015

(30) Foreign Application Priority Data

May 20, 2014 (AU) ................................ 2014202744

(51) Int. Cl.
G03B 15/07 (2006.01)

(52) U.S. Cl.
CPC .................................... G03B 15/07 (2013.01)

(58) Field of Classification Search
USPC ......................................................... 396/182
See application file for complete search history.

(56) References Cited

U.S. PATENT DOCUMENTS 5,481,439 A * 1/1996 Goto ....................... F21V 21/22
                                                                356/222
6,207,946 B1  3/2001 Jusoh et al.
(Continued)

FOREIGN PATENT DOCUMENTS

AU    2011254040 B2    7/2013
JP    2002-207236 A    7/2006

OTHER PUBLICATIONS

Ram Shacked and Dani Lischinski, "Automatic Lighting Design using a Perceptual Quality Metric", Eurographics 2001, 12 pages, vol. 20 (2001), No. 3, The Eurographics Association and Blackwell Publishers 2001.

(Continued)

Primary Examiner — Clayton E Laballe
Assistant Examiner — Linda B Smith
(74) Attorney, Agent, or Firm — Canon U.S.A., Inc. IP Division

(57) ABSTRACT

A method of re-configuring a lighting arrangement (120-170) used to light a scene (100) which is to be captured by an image capture device (110), the method including the steps of: obtaining an initial image of the scene (100) using an initial configuration (190) of the lighting arrangement; developing an image content map identifying at least one scene characteristic of at least a part of the scene (100) captured in the initial image; determining a desired aesthetic effect for a further image to be captured based on the scene (100); in accordance with the at least one scene characteristic identified in the image content map, selecting from a plurality of aesthetic factors at least one aesthetic factor involving adjustment in order to achieve the determined desired aesthetic effect for the further image; and developing at least one lighting parameter for re-configuring the lighting arrangement (120-170), wherein the at least one lighting parameter corresponds with the at least one selected aesthetic factor.

26 Claims, 11 Drawing Sheets

(56) References Cited

U.S. PATENT DOCUMENTS

| | | | |
|---|---|---|---|
| 6,270,228 B1* | 8/2001 | Axen | G03B 15/07 |
| | | | 362/11 |
| 6,993,255 B2 | 1/2006 | Braun et al. | |
| 7,321,725 B2 | 1/2008 | Seo et al. | |
| 7,643,746 B2 | 1/2010 | Yoneda et al. | |
| 7,646,974 B2 | 1/2010 | Wernersson | |
| 7,684,007 B2 | 3/2010 | Hull et al. | |
| 7,756,413 B2 | 7/2010 | Matsui | |
| 7,764,880 B2 | 7/2010 | Hamada | |
| 7,869,705 B2 | 1/2011 | Liu et al. | |
| 7,920,205 B2 | 4/2011 | Awazu | |
| 8,090,153 B2 | 1/2012 | Schofield et al. | |
| 8,111,874 B2 | 2/2012 | Chan | |
| 8,218,963 B2 | 7/2012 | Adelsberger et al. | |
| 8,253,824 B2 | 8/2012 | Benezra et al. | |
| 8,285,133 B2* | 10/2012 | DeLuca | G03B 7/08 |
| | | | 348/371 |
| 8,314,880 B2 | 11/2012 | Matsui | |
| 2004/0017164 A1* | 1/2004 | Belliveau | H05B 37/0254 |
| | | | 315/294 |
| 2005/0069206 A1 | 3/2005 | Ma et al. | |
| 2005/0248299 A1* | 11/2005 | Chemel | H05B 37/029 |
| | | | 315/312 |
| 2007/0201740 A1* | 8/2007 | Kuwata | G06T 11/60 |
| | | | 382/162 |
| 2007/0236931 A1* | 10/2007 | Chien | F21S 8/035 |
| | | | 362/249.07 |
| 2009/0010537 A1* | 1/2009 | Horie | G09G 5/02 |
| | | | 382/167 |
| 2009/0185358 A1* | 7/2009 | Liu | G03B 15/02 |
| | | | 362/3 |
| 2010/0086200 A1 | 4/2010 | Stankiewicz et al. | |
| 2011/0134021 A1 | 6/2011 | Schmitz et al. | |
| 2013/0120636 A1* | 5/2013 | Baer | G03B 15/05 |
| | | | 348/335 |
| 2013/0129195 A1 | 5/2013 | Ho et al. | |
| 2013/0314565 A1* | 11/2013 | Spielberg | G03B 15/05 |
| | | | 348/224.1 |
| 2014/0091731 A1* | 4/2014 | Fushimi | H05B 37/0245 |
| | | | 315/292 |

OTHER PUBLICATIONS

Ankit Mohan et al., "Table-top Computed Lighting for Practical Digital Photography", Eurographics Symposium on Rendering, 2005, 8 pages, The Eurographics Association.

* cited by examiner

SYSTEM AND METHOD FOR RE-CONFIGURING A LIGHTING ARRANGEMENT

CROSS-REFERENCE TO RELATED PATENT APPLICATION(S)

This application claims the benefit of priority under 35 U.S.C. § 119 of the filing date of Australian Patent Application No. 2014202744, filed May 20, 2014, hereby incorporated by reference in its entirety as if fully set forth herein.

FIELD OF INVENTION

The present invention relates generally to a system and method for re-configuring a lighting arrangement. In particular, the present invention relates to a method of re-configuring, and a light controller adapted to re-configure, a lighting arrangement used to light a scene which is to be captured by an image capture device.

DESCRIPTION OF BACKGROUND ART

A key problem in the field of studio image capture is how to configure a lighting arrangement to obtain an aesthetically pleasing image. Professional, photographers, video and movie makers are trained to master the art of configuring the lighting arrangement by setting the lighting parameters (such as, intensity, spatial position and distribution, direction, diffusion, spectral distribution etc.) to light a scene that is to be captured by a camera, in order to obtain the aesthetic result they are aiming for. The quality of the images produced by professionals using studio lighting is carefully optimised by thoughtful configuration of the studio lighting.

Professional training is used to acquire the skills to adequately configure studio lighting. As a result, high studio lighting quality is out of reach for untrained users who lack these skills Therefore untrained users cannot easily achieve optimal image quality capture in situations when the scene is not naturally well lit.

When the scene is naturally well lit (e.g. an outdoor scene lit by sun light), most cameras are able to autonomously set numerous capture parameters to achieve very good image quality, thereby assisting an untrained user and reducing the skills gap between trained and untrained users.

In addition to this, through-the-lens (TTL) flash systems can help users light a scene, by automatically adjusting the global level of light delivered by the flash or its colour temperature. Unfortunately TTL flashes often produce images that are not aesthetically pleasing. For example, foreground objects might be over-exposed and appear too bright and blue while the background is under-exposed and may appear dim and yellowish. The spatial position of the flash relative to the scene might not be optimal when the flash is attached to the camera body. Further, it may be difficult for the untrained user to locate or configure the flash when the flash uses wireless technology.

Some existing methods focus on producing a spatially adaptive even lighting, with the goal to capture a better image. These methods achieve constant illumination across a range of distances from the scene based on depth information, or achieve constant brightness on the main subject, adapt the flash intensity depending on the depth and reflectivity of features in the scene, use flash only in certain areas of the image, rely on existing light for other areas, or prevent shadow creation with spatial distribution of flash lights.

Other methods describe how to adjust the colour of the light to match colour characteristics of existing surrounding light (e.g. the sun) captured by the camera to resolve colour lighting problems as well as to adjust colours, or correct face colour into an appropriate skin colour.

Some of these previous methods are based on the assumption that uniform lighting (spatially and/or spectrally) across the scene will generally produce aesthetically pleasing images. Yet one problem is that, depending both on the scene and on the desired aesthetic effect, uniform lighting does not always produce a desirable aesthetic quality. For example, users might prefer the aesthetic effect of light gradations and shadows in portraits.

SUMMARY OF THE INVENTION

The present disclosure provides a system that allows untrained users to easily create a complex lighting configuration in order to obtain the aesthetic effect that they are aiming for and give them the flexibility approaching that available to professionals.

According to one aspect of the present disclosure, there is provided a method of re-configuring a lighting arrangement used to light a scene which is to be captured by an image capture device, the method including the steps of: obtaining an initial image of the scene using an initial configuration of the lighting arrangement; developing an image content map identifying at least one scene characteristic of at least a part of the scene captured in the initial image; determining a desired aesthetic effect for a further image to be captured based on the scene; in accordance with the at least one scene characteristic identified in the image content map, selecting from a plurality of aesthetic factors at least one aesthetic factor involving adjustment in order to achieve the determined desired aesthetic effect for the further image; and developing at least one lighting parameter for re-configuring the lighting arrangement, wherein the at least one lighting parameter corresponds with the at least one selected aesthetic factor.

According to a further aspect, there is provided a light controller adapted to re-configure a lighting arrangement used to light a scene which is to be captured by an image capture device, the light controller adapted to: obtain an initial image of the scene using an initial configuration of the lighting arrangement; develop an image content map identifying at least one scene characteristic of at least a part of the scene captured in the initial image; determine a desired aesthetic effect for a further image to be captured based on the scene; in accordance with the at least one scene characteristic identified in the image content map, select from a plurality of aesthetic factors at least one aesthetic factor involving adjustment in order to achieve the determined desired aesthetic effect for the further image; and develop at least one lighting parameter for re-configuring the lighting arrangement, wherein the at least one lighting parameter corresponds with the at least one selected aesthetic factor.

Other aspects are also disclosed.

BRIEF DESCRIPTION OF THE DRAWINGS

One or more embodiments of the invention will now be described with reference to the following drawings.

DETAILED DESCRIPTION OF EMBODIMENTS OF THE INVENTION

Figure 1:
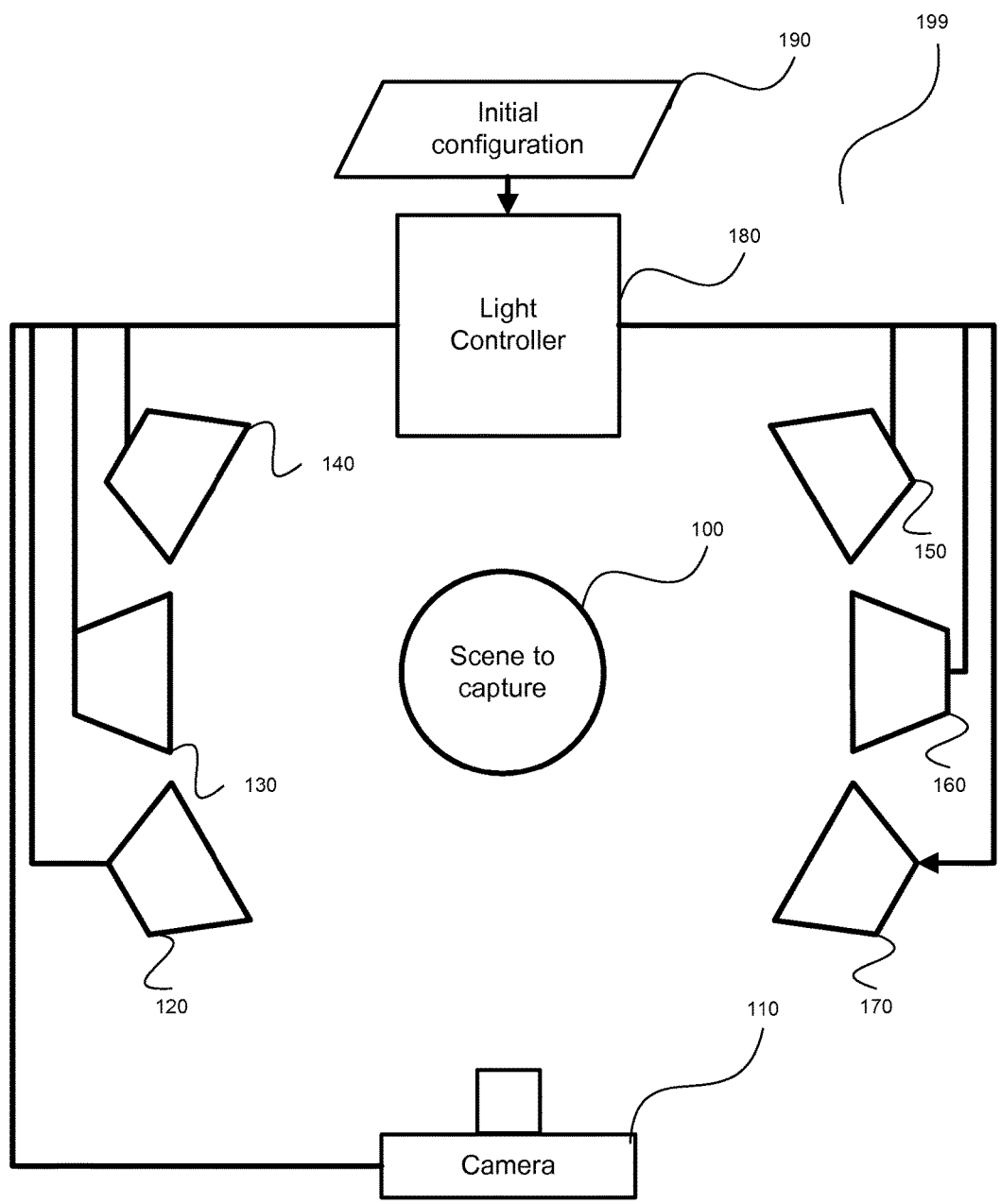
FIG. 1 is a schematic representation of an image capture system according to the present disclosure.

Where reference is made in any one or more of the accompanying drawings to steps and/or features that have the same reference numerals, those steps and/or features have for the purposes of this description the same function (s) or operation(s), unless the contrary intention appears.

The herein disclosure describes a method of re-configuring, and a light controller adapted to re-configure, a lighting arrangement used to light a scene which is to be captured by an image capture device, in order to achieve a desired aesthetic effect. The lighting arrangement or configuration includes lighting parameters of, for example, but not limited to: the spatial position of each light fixture relative to the scene, its orientation, diffuseness, power, colour temperature and colour rendering index. That is, the lighting arrangement or lighting configuration includes positional or spatial lighting parameters as well as lighting control parameters for controlling the light fixtures.

The method and light controller allows untrained users to easily create a complex lighting configuration in order to obtain the desired aesthetic effect that they are aiming for and provide them with the flexibility approaching that available to professionals.

It will be understood that a computer readable non-transitory medium may include instructions for execution on a processor to perform one or more of the methods described herein.

The system will now be described with reference to FIG. 1. FIG. 1 shows an exemplary imaging system 199. The imaging system 199 includes a camera 110, a light controller 180 and light fixtures 120, 130, 140, 150, 160 and 170.

The camera 110 shown in FIG. 1 is a still image camera. However, it will be understood that other cameras may also be used, such as a video camera, slow motion camera, or any combination thereof.

The scene 100 is lit by various light fixtures 120, 130, 140, 150, 160 and 170. These light fixtures are controlled by a light controller, which can adjust the properties of each fixture independently, such as the spatial distribution, spectrum, colour temperature, colour rendering index or power, for example.

The light controller 180 is connected to the camera 110, the light fixtures are switched-on and set up in an initial lighting configuration using a lighting configuration file 190, which is created or developed by the light controller 180.

In a situation where a light configuration file does not already exist for use by the light controller, the light controller may develop the lighting configuration file by determining the data values to be stored within the lighting configuration file and creating a file with those data values. If a configuration file already exists for use by the light controller, the light controller may determine the data values to be stored within the lighting configuration file and may subsequently store those values in the existing configuration file, or alternatively, the light controller may create a further light configuration file in which the determined data values are stored.

The light configuration file 190 contains data values based on information about the initial configuration parameters of the light fixtures. The lighting configuration file 190 also indicates which of the configuration parameters are adjustable as well as the range of adjustment available.

The camera 110 captures the scene 100 lit using the initial lighting configuration. That is, the initial image of the scene is obtained using an initial configuration of the lighting arrangement. The captured image is then sent to the light controller 180. Both the captured image and the initial lighting configuration 190 are analysed by the light controller 180. The light controller 180 uses information extracted from the image (feature extraction), along with information related to aesthetic effects and/or perception. This information is captured and used with aesthetic models and/or perceptual quality models to determine a new configuration of the lighting arrangement. New lighting parameters for the light configuration are determined and applied to the lighting system to achieve the desired aesthetic effect.

This method and associated system produces images that, after reconfiguration of the lighting arrangement, achieve the desired aesthetic effect.

Figure 2A:
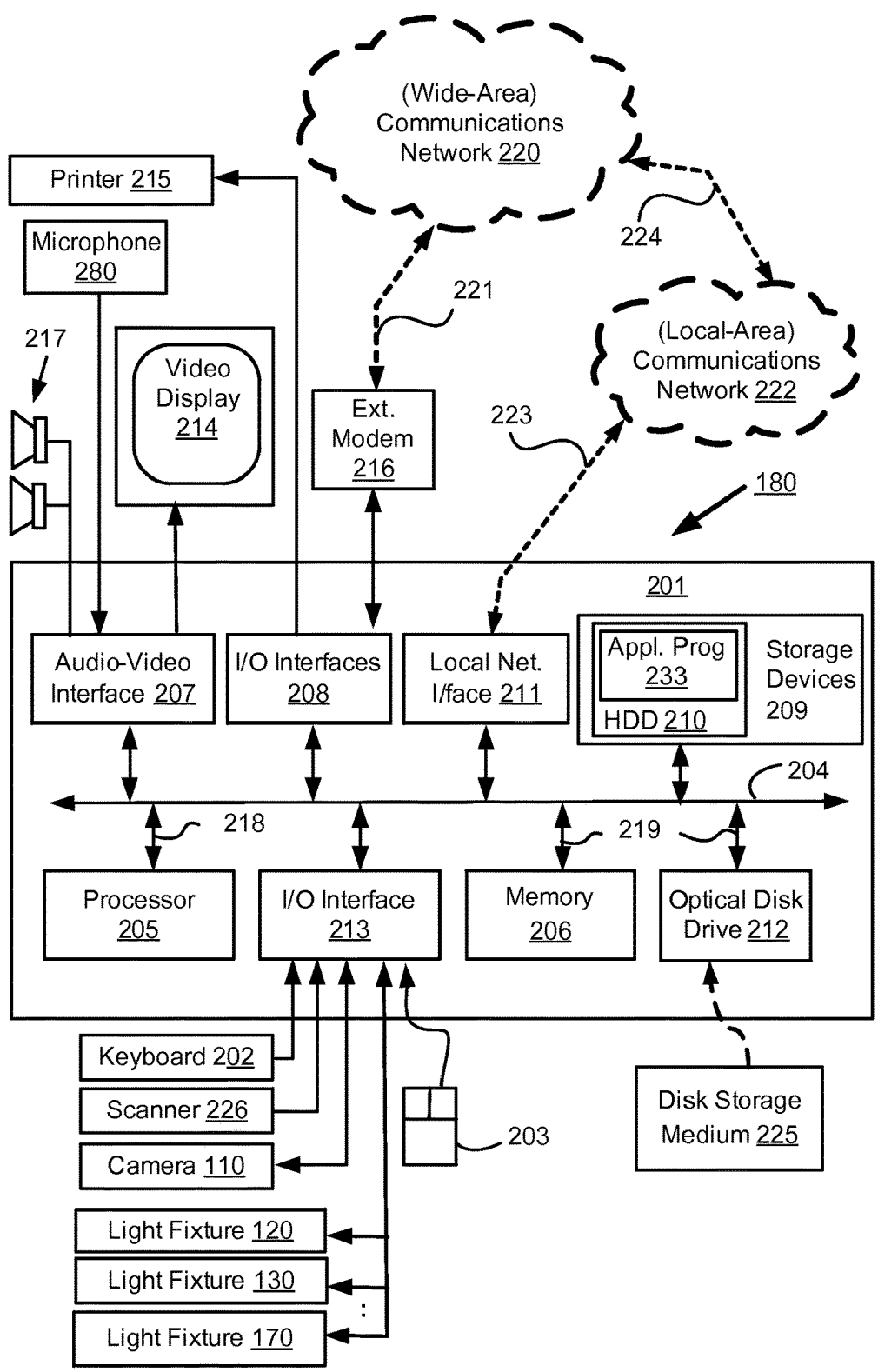
FIG. 2A and FIG. 2B are representations of a schematic block diagram of a general purpose computer upon which methods described herein may be practiced.
Figure 2B:
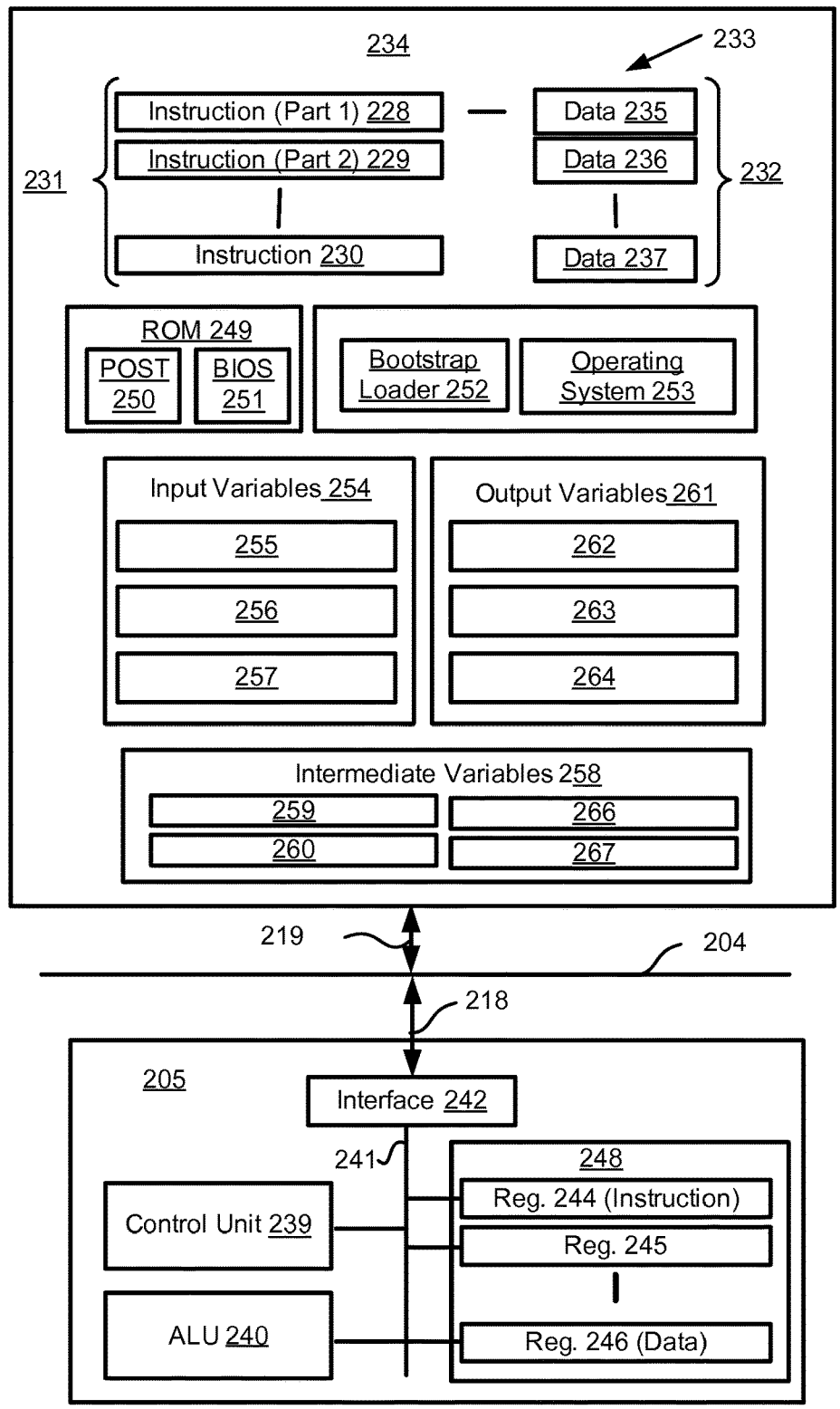

FIGS. 2A and 2B depict a light controller in the form of a general-purpose computer system 180, upon which the various arrangements described can be practiced.

As seen in FIG. 2A, the light controller 180 is in the form of a computer system, which includes: a computer module 201; input devices such as a keyboard 202, a mouse pointer device 203, a scanner 226, the camera 110 (e.g. the camera shown in FIG. 1), and a microphone 280; and output devices including a printer 215, a display device 214 and loudspeakers 217.

It will be understood that the camera 110 may also be considered an output device (as well as an input device) as depicted by the bidirectional communication channel between the I/O interface 213 and the camera 110. Further, the light fixtures 120, 130, 140, 150, 160 and 170 are in communication with the I/O interface 213 and are considered both input and output devices as depicted by the bidirectional communication channel between each of the light fixtures and the I/O interface 213.

An external Modulator-Demodulator (Modem) transceiver device 216 may be used by the computer module 201 for communicating to and from a communications network 220 via a connection 221. The communications network 220 may be a wide-area network (WAN), such as the Internet, a cellular telecommunications network, or a private WAN. Where the connection 221 is a telephone line, the modem

216 may be a traditional "dial-up" modem. Alternatively, where the connection 221 is a high capacity (e.g., cable) connection, the modem 216 may be a broadband modem. A wireless modem may also be used for wireless connection to the communications network 220.

It will be understood that, as an alternative, the communication channel between the computer system 180 and the camera 110 and the light fixtures (120 to 170) may be by way of the external modem 216 and the WAN 220.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 110, light fixtures (120-170) and optionally a joystick or other human interface device (not illustrated); and an interface 208 for the external modem 216 and printer 215. In some implementations, the modem 216 may be incorporated within the computer module 201, for example within the interface 208. The computer module 201 also has a local network interface 211, which permits coupling of the computer system 180 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet circuit card, a Bluetooth® wireless arrangement or an IEEE 802.11 wireless arrangement; however, numerous other types of interfaces may be practiced for the interface 211.

It will be understood that, as an alternative, the communication channel between the computer system 180 and the camera 110 and the light fixtures (120 to 170) may be by way of any of the communication mechanisms provided by the local network interface.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 180.

The components 205 to 213 of the computer module 201 typically communicate via an interconnected bus 204 and in a manner that results in a conventional mode of operation of the computer system 180 known to those in the relevant art. For example, the processor 205 is coupled to the system bus 204 using a connection 218 Likewise, the memory 206 and optical disk drive 212 are coupled to the system bus 204 by connections 219. Examples of computers on which the described arrangements can be practised include IBM-PC's and compatibles, Sun Sparcstations, Apple Mac™ or a like computer systems. It will be understood that, if a smartphone or tablet device has sufficient processing power, memory and suitable interfaces, the processes and methods described herein could be implemented on such a device.

The method of re-configuring a lighting arrangement may be implemented using the computer system 180 wherein the processes of FIGS. 5 to 9, to be described, may be implemented as one or more software application programs 233 executable within the computer system 180. In particular, the steps of the method of re-configuring a lighting arrangement are effected by instructions 231 (see FIG. 2B) in the software 233 that are carried out within the computer system 180. The software instructions 231 may be formed as one or more code modules, each for performing one or more particular tasks. The software may also be divided into two separate parts, in which a first part and the corresponding code modules performs the lighting arrangement re-configuration methods and a second part and the corresponding code modules manage a user interface between the first part and the user.

The software may be stored in a computer readable medium, including the storage devices described below, for example. The software is loaded into the computer system 180 from the computer readable medium, and then executed by the computer system 180. A computer readable medium having such software or computer program recorded on the computer readable medium is a computer program product. The use of the computer program product in the computer system 180 preferably effects an advantageous apparatus for reconfiguring one or more lighting arrangements.

The software 233 is typically stored in the HDD 210 or the memory 206. The software is loaded into the computer system 180 from a computer readable medium, and executed by the computer system 180. Thus, for example, the software 233 may be stored on an optically readable disk storage medium (e.g., CD-ROM) 225 that is read by the optical disk drive 212. A computer readable medium having such software or computer program recorded on it is a computer program product. The use of the computer program product in the computer system 180 preferably effects an apparatus for re-configuring a lighting arrangement.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 180 from other computer readable media. Computer readable storage media refers to any non-transitory tangible storage medium that provides recorded instructions and/or data to the computer system 180 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of software, application programs, instructions and/or data to the computer module 201 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 180 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the system 180 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 180 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, camera 110, light fixtures (120-170), data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The disclosed lighting system re-configuring arrangements use input variables 254, which are stored in the memory 234 in corresponding memory locations 255, 256, 257. The lighting system re-configuring arrangements produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

a fetch operation, which fetches or reads an instruction 231 from a memory location 228, 229, 230;

a decode operation in which the control unit 239 determines which instruction has been fetched; and an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the processes of FIGS. 5 to 9 is associated with one or more segments of the program 233 and is performed by the register section 244, 245, 247, the ALU 240, and the control unit 239 in the processor 205 working together to perform the fetch, decode, and execute cycles for every instruction in the instruction set for the noted segments of the program 233.

It will be understood that a computer readable non-transitory medium may also include instructions for execution on the processor to perform one or more of the methods described herein.

Figure 3:
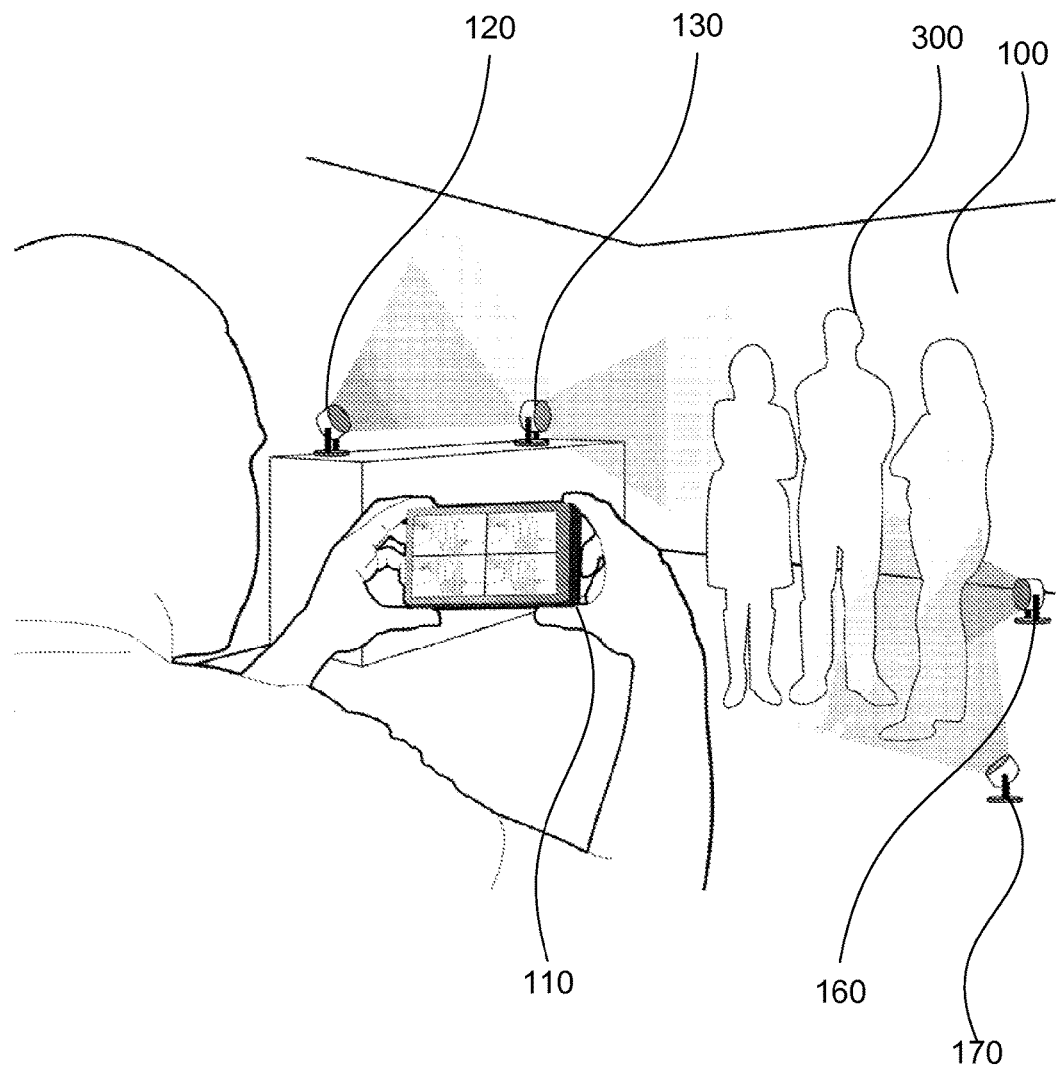
FIG. 3 is a representation of the image capture system according to the present disclosure.

According to a first example, as represented in FIG. 3, an untrained user is at home or in the office and wants to capture an image or a sequence of images of a scene with a camera 110. For example, the scene 100 may be a group of people 300. The scene is lit by a set of light fixtures (120, 130, 160, 170). The aesthetic effect of the captured images will depend on:

1. the scene content and characteristics,
2. the light characteristics based on the lighting parameters,
3. the camera settings and characteristics.

The user has a particular aesthetic look in mind and can use the herein described method and system to control lighting parameters associated with the light fixtures to light the scene and achieve the desired aesthetic effect. For example, the user might desire an image that has a "punchy" or "contrasty" aesthetic effect.

Scene Characteristics

In the example shown in FIG. 3, the scene 100 is a group of people 300, but any other scenes could be used. The scene characteristics such as the size of the group, the skin tone of each individual, the body shape and size of the individuals and the colours of each individual's outfit may have an impact on the look of the captured image. For example, colourful outfits may help achieve a punchy image, while a grey outfit may not. Similarly, contrast between the different object colours in the scene may help achieve a contrasty image.

All these scene characteristics may have a varied impact on the effect of the light provided by the lighting arrangement. For example, a white outfit will reflect more light than a dark outfit, and the image features will vary: the same light configuration might be appropriate for the dark outfit, but result in an overexposed image part with a white outfit. When optimizing light power to produce a pleasing image, the colour of this outfit will therefore impact the determination of the amount of light. Similarly, a Caucasian face and an Asian face have different types of features. The properties of the shadows on these two faces will depend both on the face features and the light characteristics.

The position of each individual, or the addition or subtraction of individuals, in the scene may also impact the aesthetic effect of the image. For example, movement of one individual in a scene may affect the aesthetic effect of the later image.

Therefore changes in the scene characteristics will modify the aesthetic effect produced in the captured image.

Light Fixtures and Studio Setup

In the example shown in FIG. 3, the scene 100 including a group of people 300 is lit by four light fixtures 120, 130, 160, and 170. It will be understood that the system may utilise any number of light fixtures from 1 to N.

The characteristics of these light fixtures, such as spatial position, colour, angular range, diffuseness and direction, can be modified by the light controller and/or the user, to achieve the desired aesthetic effect. The light fixtures may be composed of several lamps of a different type, such as Light-Emitting Diodes (LEDs), xenon lamps, halogen lamps, lasers or fluorescent lamps with different spectral distributions. One or more of these lamps may be tuned individually by the light controller to modify the characteristics of the light produced by the light fixture. For example, one or more lamps may be turned on or off, or the luminosity of one or more lamps may be tuned to a desired level by controlling, and changing if necessary, the frequency of the electric current applied to the lamp, for example. That is, a lower frequency will lower the luminosity level of an LED, whereas a lower voltage will affect the colour temperature of a halogen lamp. The controller effectively controls the characteristics of the current applied to each lamp, thereby tuning each lamp.

The optical path can also be tuned by the light controller to modify the geometry of the light beam produced by the fixture, for example its angular coverage, its diffuseness.

Alternatively, one or more of the light fixtures may be a light source such as a LED, a halogen lamp, a laser or a fluorescent lamp, modulated by a screen such as an LCD screen. In regard to the LCD screen fixture, the light controller may modulate the screen properties at the pixel level. For example, the screen may have two regions, the first region is a white disk and the second region is a black surrounding rectangle. The white disk transmits the light produced by the light fixture, while the black surrounding rectangle blocks the light produced by the light fixture. The light is modulated by controlling, and changing if necessary, one or more properties of the white circle. Modulation of the properties of the circle, such as the shape, the colour or the size of the circle, results in modulation of the properties of the light transmitted by the screen onto the scene.

Alternatively the light source may be modulated by a Digital Light Processor (DLP). A DLP is a type of projector technology that uses a digital micro minor device, composed of microscopically small minors laid out in a matrix. The controller may be adapted to control the orientation of one or more of the small minors to modulate the light.

Figure 4A:
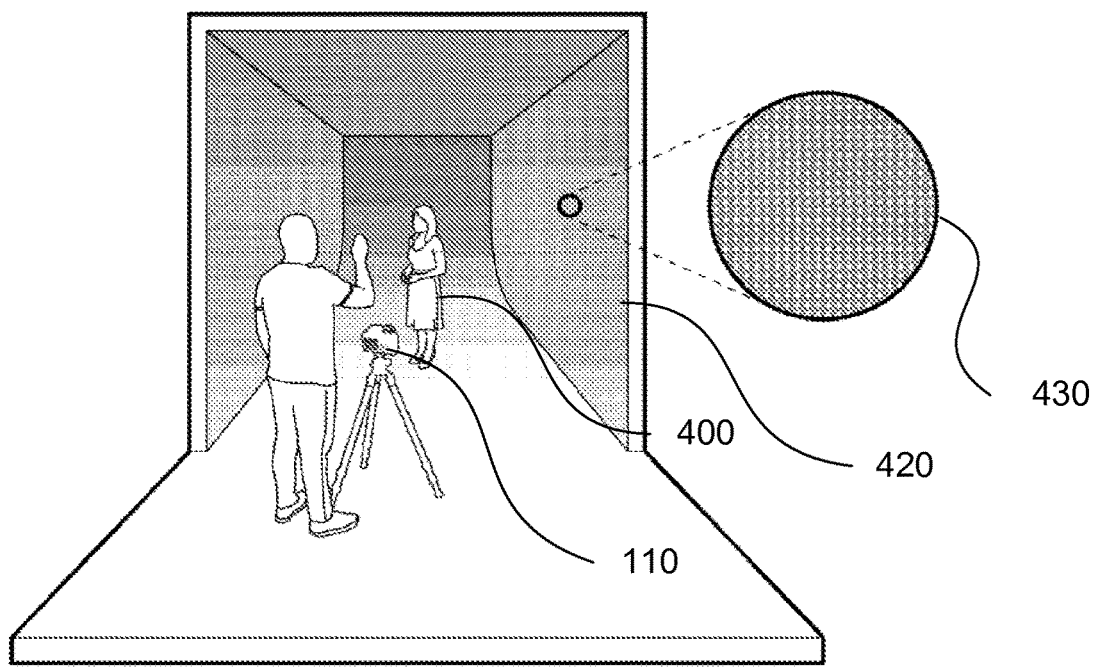
FIG. 4a and FIG. 4b are representations of image capture systems described in the present disclosure.

FIG. 4a shows an alternative image capture system. An untrained user rents a photo studio, equipped with a camera 110 and lighting walls 420 surrounding the scene. These walls are composed of independent small light fixtures 430 (such as LEDs for example) that can be controlled individually by the light controller. One or more of the independent light fixtures can be tuned individually by the light controller to modify the characteristics of the light produced by the lighting wall on the scene 400. The controller is adapted to tune one or more of these lamps individually by controlling the electric current applied to each of the lamps independently. For example, one or more of the lamps may be turned on or off, or the luminosity of the lamp may be tuned to a desired level by controlling, and changing if necessary, the characteristics of the electric current applied to it, such as its frequency. The voltage applied to the lamp may also be controlled.

Figure 4B:
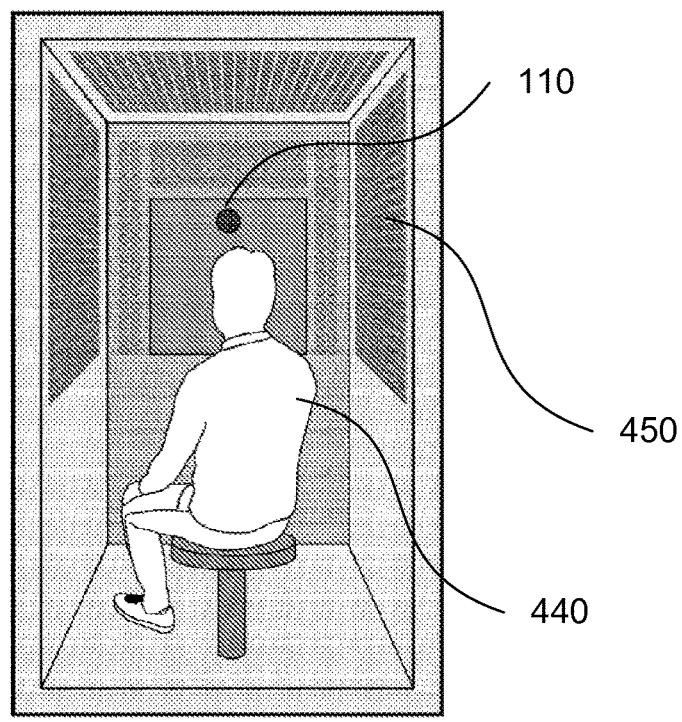

FIG. 4b shows a further alternative image capture system. In this example, a user wants to capture a self-portrait in a photo booth. The photo booth is equipped with a camera 110 and lighting walls 450 surrounding the scene. These walls are composed of independent small light fixtures (such as LEDs for example) that can be controlled individually by the light controller. One or more of the light fixtures may be tuned individually by the light controller to modify the characteristics of the light produced by the lighting wall to affect the light transmitted onto the user 440. For example, each lamp is turned on or off, or the luminosity of the lamp may be tuned to a desired level by changing the characteristics of the electric current applied to it, such as its frequency. The voltage applied to the lamp may also be controlled. For example, the controller may be adapted to tune each of the lamps individually by controlling, and changing if necessary, the current applied to each of these lamps independently.

Another alternative image capture system may use the available lights in a room, where the available lights may communicate using the "internet of things". That is, the "internet of things" includes the embedding of sensors in devices to enable the devices to communicate with each other and/or other devices. Therefore, the lights may include sensors and communication devices to communicate operational parameters and their characteristics to the light controller. The light controller may use a wireless network to detect the presence of available lights in the room which are connected in this manner and the detected lights may communicate their characteristics to the light controller. The available lights may be lights that are installed or placed in the room for general room lighting, and may not specifically be designed for photography. For example, the lights may include lights installed in the ceiling, desk lamps or floor lamps. The light controller may also control the lighting characteristics of the lights, or a subset of the characteristics, individually using the wireless network.

Another alternative lighting control system may be used after capture of the image using virtual lights. For example, the camera may capture an image and a depth map, and the camera may use these to estimate the reflectance and illumination in the captured scene and build a 3D model of the lighting and the scene. The lighting controller may then perform relighting by adding virtual lights to the 3D model, and render the effect on the captured image using computer graphics ray-tracing. The lighting characteristics of the virtual lights may be controlled by the lighting controller.

Light Controller Communication

Although the flexibility of these fixtures is advantageous, the user may not know how to adjust the fixtures to achieve the desired aesthetic effect and so may rely on the light controller 180 to achieve the desired aesthetic effect.

The light controller is 180 may be a standalone device. Alternatively, it may be embedded in one or more of the light fixtures, in the camera, or in a smartphone or a personal computer (PC). The task of the light controller is to modify the light configuration to achieve the user's desired aesthetic effect.

The light fixtures, the camera and the light controller communicate with each other either through a wired connection, such as for example connections supported by CANON DSLRs and FLASHs, or wirelessly, such as for example by Bluetooth, Infrared, WIFI, etc.

The light fixtures provide information about their current configurations, and the range of characteristics they can be tuned to, to the controller.

Figure 5:
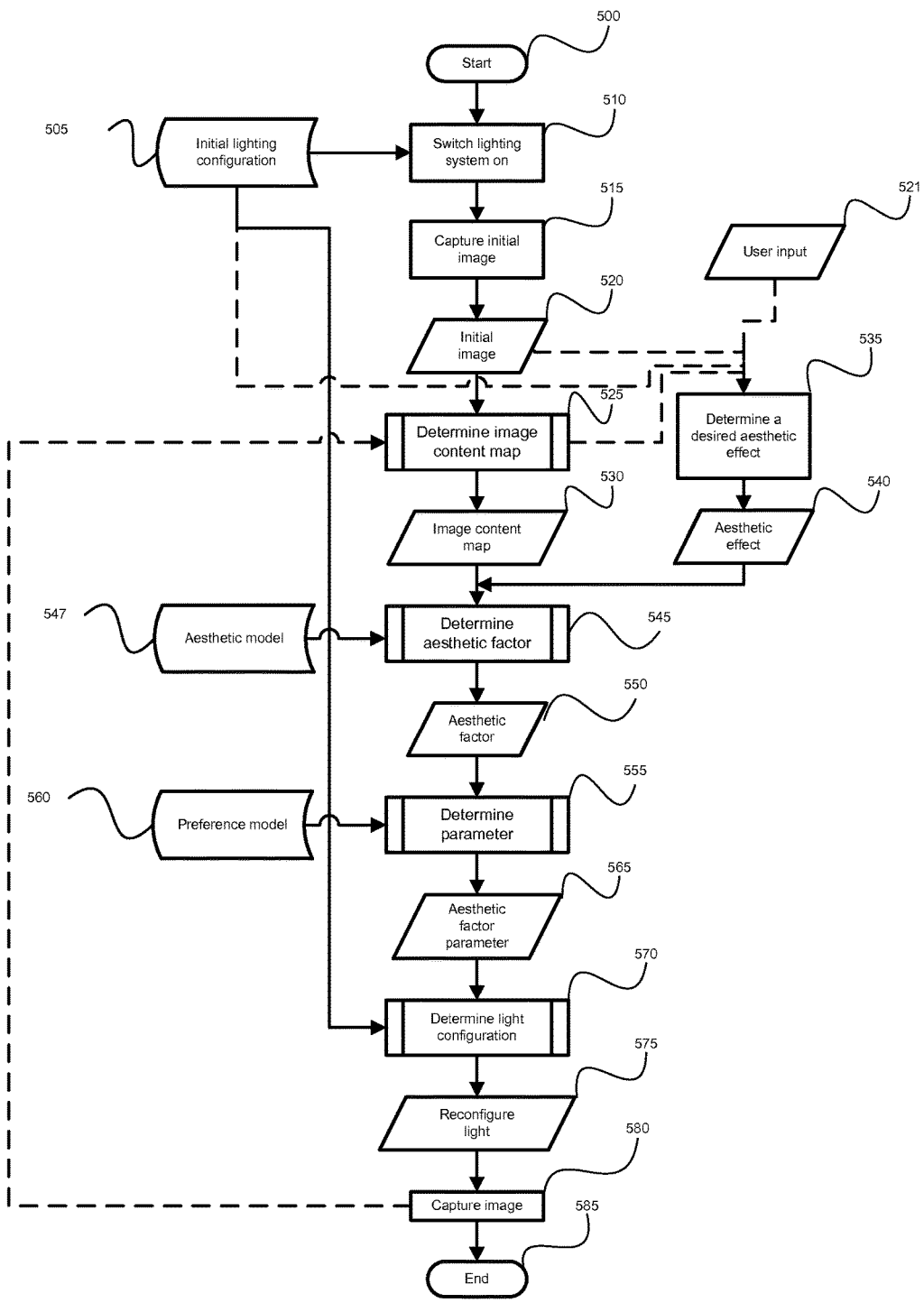
FIG. 5 is a schematic flow diagram illustrating a method of re-configuring a lighting arrangement used to light a scene which is to be captured by an image capture device, as described in the present disclosure.

An example of how the configuration of a light system is controlled is now described with reference to FIG. 5.

Initial Lighting Configuration

One or more initial lighting configurations 505 may be retrieved, in the form of a digital file for example, from storage device 209 (e.g. any suitable storage device, memory, or storage medium). For example, the initial lighting configuration may have been created by the user via a light controller user interface, or created by the user via other user interfaces such as the camera interface.

The initial lighting configuration 190 may be stored, for example, in the form of a digital text file, and contain all the information about the initial characteristics of the one or more light fixtures, such as, for example, the position of each fixture relative to the camera and/or relative to the scene, the spatial distribution of the light the light fixture(s) produces, the spectral distribution of the light fixture(s), the light fixture(s)' colour temperature etc. That is, the lighting configuration file stores the lighting parameters in the storage device, including the spatial/positional parameters and the light control parameters. That is, the light controller may be adapted to determine the initial configuration of the lighting arrangement by communicating with one or more of the light fixtures that are arranged to light the scene. The light controller may then obtain lighting parameters associated with the one or more light fixtures.

This initial lighting configuration file also indicates which of these characteristics are adjustable as well as the range of adjustment available for the adjustable characteristics. For example, if colour temperature can be modified, the range of colour temperature adjustment will be indicated in the lighting configuration file.

In the lighting wall examples described above with reference to FIGS. 4*a* and 4*b*, a fixed default configuration file may be provided by the light controller to the user when the lighting wall is purchased for use.

Alternatively, the configuration file may initially be manually created or developed by the user for use by the light controller.

The user may develop a configuration file via a user interface that is in communication with the light controller, where data values for the configuration file are selected by the user, a light configuration file is created (if one does not already exist or a further light configuration file is desired) and the data values are subsequently stored within the light configuration file.

As a further alternative, different elements of the system may automatically communicate with the light controller to automatically create or develop the initial configuration file.

Initial lighting configurations 190 can be designed by experts for typical situations and use cases. An initial lighting configuration file may be developed in the same manner as described above. For example, for the portrait use case, the lighting configuration file may include data values for diffuse light being directed from both sides of the subject, with slightly more power on one side. The light controller may retrieve the predefined configuration details from the stored configuration file stored in the storage device.

That is, the light controller may be adapted to select a desired configuration of the lighting arrangement from one or more use-case specific predetermined lighting configurations, identify an initial configuration file associated with the selected desired configuration, and develop lighting parameters for configuring the lighting arrangement using the initial configuration file so that the initial configuration of the lighting arrangement corresponds with the selected desired configuration.

| Example: initial lighting configuration for a light fixture | | | | |
|---|---|---|---|---|
| Characteristic/ Parameter | Current value | Adjustable (yes/user action needed/no) | Available range | Adjustment step |
| Colour temperature (Kelvin) | 5500 | Yes | [3000, 11000] | 100 |
| Colour rendering index | 80 | Yes | [20, 100] | 5 |
| Power (W) | 50 | Yes | [0, 80] | 0.1 |
| Position of fixture relative to the camera (meters) [left, front, height] | [−2; 1; 1] | Yes | [−5, +5; −5, +5; 0, 2] | [0.01; 0.01; 0.01] |

-continued

Example: initial lighting configuration for a light fixture

| Characteristic/ Parameter | Current value | Adjustable (yes/user action needed/no) | Available range | Adjustment step |
|---|---|---|---|---|
| Spatial angle of the light (degrees) | 30 | Yes | [1, 90] | 1 |
| Diffuseness | 0 | User action needed | [0, 1] | 0.5 |

As an alternative, an initial configuration file may not be available for the light controller to use configuration data stored therein to configure the lighting arrangement. That is, an initial configuration file may not have been created or developed, and so stored in the storage device. For example, the light fixtures might be switched on already and in a particular state, e.g. a previously used lighting configuration that was not achieved using a configuration file. The light controller may develop the initial lighting configuration file, in a manner as described above, through communication between the light controller and the light fixtures, with each light fixture providing its position and orientation determined using sensors and systems such as Indoor Positioning Systems (IPS) making use of radio or optical technologies. Also, information may be added to the configuration file by the light controller after capturing the initial image by the light controller performing image analysis, or modulating the light and analysing the effect on the captured image.

The lighting arrangement may be switched on and setup 510 according to the newly created initial configuration 190 stored in the configuration file.

If the light fixtures can be moved freely and their spatial position can be changed by the user, the user may desire assistance from the system early in the process, to obtain information on how to position the fixtures according to an initial configuration. The light controller is able to determine how many light fixtures are available and their associated characteristics by retrieving the light configuration file from the storage device and reading that file. The user may also access an internal database to obtain information associated with a pre-set default initial spatial configuration that corresponds to the number of light fixtures and other light fixtures characteristics, such as their colour properties, diffuseness and power for example.

The light controller communicates the initial spatial configuration to the user via the light controller user interface. Alternatively, the initial spatial configuration may be provided by the user via other user interfaces such as the camera interface. The user is in charge of manually placing the light fixtures.

The light controller may also communicate the initial diffuseness configuration to the user via the light controller interface. The user may manually add to or remove soft boxes from the light fixtures to adjust the diffuseness of each light fixture. The diffuseness parameter of each light fixture may be automatically detected by each light fixture and the diffuseness parameter may then be communicated to the lighting controller. For example, the automatic detection may occur by using coded electrical contacts on the mechanical soft box connection to the fixture. Alternatively, the diffuseness parameter of each fixture may be set by the user in the lighting controller user interface.

It will be understood that the lighting parameters may be automatically or semi automatically adjusted by the light controller. That is, one or more of the light fixtures may include motors that can be controlled by the light controller. These motors may control wheels on the light fixture to position the light fixture according to the desired spatial or positional parameters within the light configuration file. One or more lighting elements on the light fixtures may be moved or adjusted by operating motors that move articulated arms on the light fixture. Positional information may be fed back to the light controller from sensors to provide a feedback loop. Further, the light controller may communicate with the lighting elements in order to monitor and control the light control parameters.

According to another example, a light fixture may include multiple light elements that can be individually controlled by the light controller. These light elements may be switched on and off as needed based on the lighting configuration stored in the light configuration file. This may have a similar effect to that of moving light fixtures as discussed above.

The camera is arranged to capture 515 an initial image 520 of the scene lit according to the initial configuration of the lighting arrangement. This image is then sent from the camera and obtained by the light controller 180 using wired or wireless communication channels as described herein.

Feature Extraction and Scene Characterization

As discussed above, both the scene characteristics and the light characteristics impact the aesthetic effect of the captured image. While the light characteristics can be communicated to the light controller by the light fixtures, as discussed earlier, the light controller is arranged to characterize the scene in order to predict the impact of changes in light configuration on the captured image.

The controller in 525 is adapted to characterize the scene by extracting information from the initial captured image. For example, global image characteristics such as, for example, the mean saturation (or chroma), shape and size of the colour gamut, hue contrast, mean hue, tonal range, global contrast, global brightness, image composition, sharpness, scene depth and depth of field ratio are extracted. Light related aesthetic aspects such as impact of shadows, shape of shadows, and modulation of light are also measured as part of the global image characteristics.

Global image characteristics based on pixel values may be calculated by accumulating statistics over the pixels in the image. For example, to calculate the global colour characteristic of mean saturation, shape and size of the colour gamut, hue contrast, and mean hue, the image may be converted to the CIELCH colour space, and then statistics over all pixels may be used to calculate the mean saturation. As a further example, to calculate the global colour characteristics of shape and size of the colour gamut, hue contrast, mean hue, global contrast, brightness and tonal range, the image may be converted to CIELab colour space. The shape and size of the colour gamut may be calculated by determining the convex hull of the pixels in CIELab coordinates to calculate the gamut volume, and by determining the major and minor axis lengths of the convex hull to characterise the gamut shape. The hue contrast and mean hue may be calculated separately on the a and b axes in Lab space, where the contrast may be calculated using the standard deviation where the mean is the average over all pixels. The global contrast and brightness may be calculated as the standard deviation and mean respectively of the luminance values of the image pixels in the CIELab colour space, and the tonal range may be characterised using the skew and kurtosis of the luminance.

The image composition may be a measure of the aesthetics of the position of the salient regions within the image. This can be affected by the lighting. For example, the lighting may create highlights or shadows which may affect the saliency and therefore the composition. The image composition may be quantified by first calculating a saliency map which, for each pixel, estimates the degree of saliency for a human observer based on a weighted combination of a low level saliency map and a high level saliency map based on face detection. The saliency map may be segmented to create a set of salient regions, where each region is associated with a mean saliency calculated from that region. The geometrical relationships of the saliency regions may then be characterised using prominent line detection. Aesthetic scores may be calculated for standard photographic composition rules including the rule of thirds, diagonal dominance and visual balance. The rule of thirds and diagonal dominance scores may be calculated using the minimum distance between the prominent lines and the rule of third lines and diagonal lines respectively. The visual balance may be calculated as the distance between the centre of the mass of the salient regions and the image centre. An image composition score may be calculated as a weighted sum of the rule of thirds, diagonal dominance and visual balance scores.

The image sharpness may be calculated as the global mean of the magnitude of the gradient of the luminance values of each pixel in the CIELCH colour space. The scene depth may be calculated for each pixel using depth estimation. Depth estimation methods may be used to calculate the scene depth for a camera image include depth from defocus, depth from stereo, and time of flight. The depth of field ratio may be calculated as the ratio of the number of image pixels for which the depth is within the depth of field, and the number of image pixels for which the depth is outside the depth of field. The depth of field may be calculated using the relative aperture of the camera lens, the focal length of the camera lens, the focus distance of the lens, and a predetermined value for the circle of confusion diameter.

The image is also segmented into several regions based on one or more predetermined local measures of the global image characteristics described above. An object recognition and scene analysis algorithm within the light controller processes the image and produces (or develops) an image content map 530 with image regions labelled with object names or object categories, such as the type of object (for example, face, body, racial background, skin, clothes, flower, food, wall, floor, table, chair etc.).

The controller may perform initial region segmentation using contour detection and hierarchical image segmentation. Object recognition may be performed using scanning-windows part models and global appearance cues, together with vote aggregation and pixel classification. Skin detection may be performed by classifying pixels by comparing the chromatic (a, b) component of the pixel values in CIELab colour space with an elliptical Gaussian parametric distribution for skin colour. Face detection may be performed using a face detection algorithm to identify the position and size of faces in the captured image. Body detection may be performed using multi-scale histogram of oriented gradients features classified using a support vector machine to identify the position and size of human bodies in the scene.

The light controller develops the image content map by either creating a new image content map or modifying an existing image content map based on the processing of the image. The subsequent image content map is then stored in the storage device.

The light controller separates the contribution of the light from the contribution of the scene objects in the final image. The controller uses the information provided by the initial lighting configuration to separate the two. For example, if the image regions are mainly blue, this can be due to the objects being blue and/or the light being blue. By retrieving information about the colour temperature of the light fixture from the initial lighting configuration file, the light controller can disambiguate the situation and identify whether the colour is caused by the colour temperature of the light source (i.e. the colour temperature is below a predetermined threshold), and if not, determine that the object is blue. As a further example, if the image is dark, this can be due to the scene elements being dark, or the light power being too low. By retrieving information about the power of the source from the initial lighting configuration file, the light controller can disambiguate the situation and identify whether the source power is too low or not. If the source power is not too low (i.e. is not below a predetermined threshold), the controller may determine that the scene elements are dark.

Under some circumstances, the light controller may not be able to disambiguate the scene and the light contributions without involving further processing of the data. For example, it may be difficult for the light controller to disambiguate shadows from surface properties. In such circumstances, a series of images may be captured by the camera with varying light configurations. This series of images is communicated to, and processed by, the light controller to obtain a finer estimation of the scene properties. For example, if the lighting arrangement includes several light fixtures, a series of images can be captured by the camera in which the fixtures are switched on one after the other, where each image is a capture of the scene lit by one the light fixtures. According to another example, a series of images may be captured by the camera in which the position of the fixtures and/or the spatial angle of the light fixtures are adjusted (either manually by the user or automatically by the light controller). By comparing the ambiguous areas in the different images, the light controller can determine whether variations exist that can be related to the change in light and so, for example, disambiguate shadows from surface properties to create a map of shadow regions in the captured image.

This series of images may be used to extract the surface and volume characteristics of the different objects, where the surface characteristics may be the reflectance function across the surface, and the volume characteristics may be the 3D shape of the objects (a depth map). Because the range of incident illumination angles is limited by the number of lights and the number of images captured, the reflectance function at each surface point is only sparsely sampled.

Once the surface and volume characteristics are extracted, the characteristics of each ambiguous area in the scene are compared to the characteristics of the same scene area in a computer graphic rendering of the scene under reference lighting, such as, for example Lambertian and/or neutral light. If the data associated with the characteristics of the two areas are identical or similar, it is determined by the light controller that the characteristics are due to the scene. Whereas, if the data associated with the characteristics of the two areas differs significantly or by a predetermined amount, it is determined by the light controller that the characteristics are due to the light. By performing this type of analysis, the light and the surface contribution to the image can be disambiguated by the light controller.

Alternatively, the series of images may be used by the light controller to extract the 3D depth of the scene. A full 3D model of the scene may be constructed by the light controller, where the 3D model is independent of the lighting arrangement. For example, the 3D model may be constructed using any of a shape from shading algorithm; structured light projected from lighting fixtures together with the positions of the lighting fixtures relative to the camera; depth from defocus from a focus bracket of images; depth from stereo using a pair of cameras; a time of flight camera; any other suitable device and/or algorithm.

Alternatively, a model of the lighting and scene may be determined using a single image lighting estimation algorithm. The captured image and depth map may be used as input to a shape, illuminance and reflectance from shading model, where a mixture of shapes and a mixture of illuminations are embedded in a soft segmentation of the image.

This 3D model may be used to simulate the contribution of the scene under reference lighting. For example, the reference lighting may be a well-defined lighting configuration, such as, for example, neutral or Lambertian light. Alternatively, the reference lighting may be a lighting configuration that is defined according to international standards. Now the scene contribution and the light contribution to the image are accurately separated from each other and no ambiguity remains. With this model, by using the light configuration information, the effect of the light on the scene is also modelled and predicted by the light controller. Any modelled lighting configuration may be simulated using computer graphic imaging.

Using the 3D model of the scene and the map of shadow regions in the captured image, additional scene characteristics including the impact of shadows, shape of shadows, and modulation of light across the scene may be measured. The impact of shadows may be calculated as the ratio of luminance between an image region with the shadow and the same image region after shadow removal is applied. Shadow removal may be applied using a path-based retinex shadow removal algorithm, using the detected shadows as input. This shadow impact factor may be calculated globally for the image and also for each image region as part of the image content map. The shape of shadows may be quantified indirectly via the effect on image composition. Alternatively, the shadow regions may be input as a saliency region map to the image composition algorithm and used to calculate an aesthetic image shadow composition score. The modulation of light across the scene may be calculated as the standard deviation of the luminance of a computer graphics rendering of the captured image of the scene where the 3D lighting and surface model has been used to set all object surfaces Lambertian scatterers with uniform reflectivity.

Therefore, the light controller may be adapted to obtain initial lighting parameters based on the initial configuration, obtain at least one scene characteristic from the image content map, determine the contribution of at least one scene characteristic to the image of the scene, determine the contribution of the initial lighting parameters to the image of the scene, and develop one or more extracted scene characteristics by separating the contribution of the at least one scene characteristic from the contribution of the initial lighting parameters.

The development of one or more scene characteristics may involve the light controller determining data values associated with the one or more scene characteristics and storing those data values in a storage device. Alternatively, the development of one or more scene characteristics may involve the light controller modifying existing data values associated with the one or more scene characteristics and storing those modified data values in a storage device. Alternatively, the development of one or more scene characteristics may involve the light controller deleting existing data values associated with the one or more scene characteristics from the storage device.

| | Example of Extracted Scene Characteristics | | | |
|---|---|---|---|---|
| Region label | Region type | Mean hue (CIELCH colour space) | Mean chroma (CIELCH colour space) | Mean contrast [0-100] |
| Region 1 | Caucasian male | 30 | 20 | 30 |
| Region 2 | Asian female | 70 | 25 | 25 |
| Region 3 | Background wall | 180 | 05 | 5 |

The image content map is a representation of the different regions in the image, each region being defined by its boundaries and content. The image content map 530 contains the global information and the local information extracted from the image. For example, the global information may be the mean chroma value for the whole image whereas the local information may be the mean chroma value for a particular region or object within the image. In general, the global information is associated with the image as a whole, whereas the local information is associated with a portion, sub-set or part of the image.

The lighting arrangement may be re-configured specifically for the scene properties. The aim of the light controller is to find a suitable lighting configuration for a specific scene and a desired aesthetic look as selected by a user. It is important to note that a change in the scene properties, such as a change of outfit, will ultimately result in a change in the desired light configuration for a particular desired aesthetic effect. Similarly, a change in the set of light fixtures, such as the availability of additional fixtures will result in a change in the light configuration for a particular desired aesthetic effect. Also, a change in desired aesthetic look will result in a change in the light configuration.

Aesthetic Effect

An aesthetic effect 540 is a distinctive, and therefore recognizable, way in which the scene is captured and in which the visual appearance of the image can be described. An aesthetic effect is determined by the system 535, based on input provided by the user via the camera user interface 521. That is, the user is able to select a desired aesthetic effect and that selection is communicated to the light controller. Therefore, the light controller is adapted to determine a desired aesthetic effect for a further image to be captured based on the scene captured by an initial image.

Possible aesthetic effects 540 include but are not limited to: punchy, colourful, happy, celebration, vintage, contrasty, natural, video, classic movie, TV show, Broadway show, studio portrait, youthful, shape/volume, portrait preference and still life preference. For example, the following aesthetic effects 540 can be defined:

Punchy is an aesthetic effect with saturated colours, strong contrast, and with an uneven lighting spatial distribution.

Colourful is an aesthetic effect with saturated colours, mild contrast, and with a balanced lighting spatial distribution.

Happy is an aesthetic effect with warm colours, pleasing skin tones, mild to high contrast, high key exposure, and balanced lighting spatial distribution.

Celebration is an aesthetic effect with natural colours, pleasing skin tones, high contrast, high key exposure, and uneven lighting spatial distribution.

Vintage is an aesthetic effect with sepia colours, low contrast and even lighting spatial distribution.

Contrasty is an aesthetic effect with a strong emphasis on contrast, and uneven lighting spatial distribution.

Natural is an aesthetic effect with an emphasis on natural light: daylight (sunlight) colour temperature, mild contrast and saturation, a single light source spatial point of origin, mild shadows.

Video is an aesthetic effect focusing on the colour rendering that is typical of the classic video cameras.

Studio portrait is an aesthetic effect with an emphasis on complex elaborated light. Flash colour temperature, mild contrast and saturation, multiple light sources, multiple shadows.

Youthful is an aesthetic effect which makes the human subject of a photo look younger and healthier, which typically involves frontal diffuse lighting.

Shape and volume is an aesthetic effect which produces a stronger perception of the shape and volume of the people and objects in the scene, which typically involves side lighting.

Alternatively:

the aesthetic effect may be determined based on the camera settings, for example the settings portrait or landscape have been selected by the user, or the maximum aperture, that is typical of a portrait with maximum amount of bokeh from which the system can determine the user desired aesthetic goal, or based on the initial image 520 and its image content map 530, for example the surface and volume characteristics of the foreground object, the type of object (such as face, flower, food etc.).

or based on the initial lighting configuration 505 if it has been set by the user.

In step 545 an aesthetic factor is selected for modification using an aesthetic model 547 and the aesthetic effect 540. An aesthetic model 547 is a mathematical expression of the relationship between aesthetic effects and the lower level aesthetic factors. Aesthetic effects can be defined for use in aesthetic model files that define the relationship between aesthetic effects 547 and aesthetic factors 550. The aesthetic models are also stored in the storage device.

An aesthetic factor 550 is a component of the overall aesthetic qualities of the image that contributes to the aesthetic effect. Possible aesthetic factors 550 include but are not limited to: mean saturation (or chroma), shape and size of the colour gamut, hue contrast, mean hue, tonal range, contrast, brightness, image composition, sharpness, scene depth and depth of field ratio, and light related aesthetic aspects such as impact of shadows, shape of shadows and modulation of light.

The aesthetic factors may relate to local and/or global characteristics contained within the image content map. The aesthetic factors may relate to characteristics, including local and/or global scene characteristics, light characteristics, and/or image characteristics contained within the image content map. The relationships between the aesthetic factors and the characteristics can be defined for use in each aesthetic model or the relationships may be common across all aesthetic models used by the lighting controller. The relationships may take the form of direct correspondence from one characteristic to one aesthetic factor, or a relationship may be a lookup table from values of a characteristic to values of an aesthetic factor, or a relationship may be a simple mathematical function from one characteristic to one aesthetic factor, or a relationship may involve combinations of characteristics contributing to a single aesthetic factor. Therefore, the re-configuring of a lighting arrangement may be based on local characteristics alone, global characteristics alone, or a combination of both local and global characteristics.

The aesthetic factor values defined in the aesthetic models are standard/average values that would apply to a standard image. Each aesthetic factor has an aesthetic factor weight WAEi (where i is an index number) specific to an aesthetic effect. For example, the aesthetic factor "mean chroma" has a greater aesthetic factor weight WAE1=0.5 than the aesthetic factor weight WAE3=0.1 of the aesthetic factor " strength of shadow" in the punchy aesthetic model. In this example, the sum of the aesthetic factor weights for each effect equals 1, however it will be understood that this is not essential.

Each particular image captured by the camera is unique and varies as the scene characteristics vary. The aesthetic factors are modulated by the aesthetic factor weights that capture the scene characteristics. For example, a given aesthetic effect "punchy" has an associated aesthetic model. Three scenes are captured. The first scene includes a white shirt, the second scene includes a black shirt and the third scene includes a red shirt. These three scenes are captured with the same desired aesthetic effect "punchy". The resulting three images will be punchy, yet each shirt will keep its colour characteristics in the final image. This is achieved by configuring the light controller to modulate the aesthetic models by scene characteristic weights WSCj (where j is an index) when capturing the scene characteristics.

Example of an Aesthetic Models File

|  |  | Aesthetic factors | | | |
|---|---|---|---|---|---|
|  |  | Mean chroma (CIELCH colour space)/ rel. weight | Mean contrast [0-100]/ rel. weight | Number of sources/ rel. weight | Diffuseness of sources [0-100]/ rel. weight |
| Aesthetic effects | Punchy | 50/ WAE1 = 0.5 | 80/ WAE2 = 0.3 | 2 to 5/ WAE3 = 0.1 | 20/ WAE4 = 0.1 |
|  | Natural | 25/ WAE1 = 0.25 | 30-50/ WAE2 = 0.25 | 1/ WAE3 = 0.25 | 40/ WAE4 = 0.25 |
|  | Studio Portrait | 35-60/ WAE1 = 0.2 | 70/ WAE2 = 0.2 | Max number available/ WAE3 = 0.4 | 20 to 80, varying across sources/ WAE4 = 0.2 |

Alternative example of an Aesthetic Models File

|  |  | Aesthetic factors | | |
|---|---|---|---|---|
|  |  | Diffuseness [0-100]/ rel. weight | Angle relative to subject [0-90 degrees]/ rel. weight | Height relative to subject [0-2 metres]/ rel. weight |
| Aesthetic effects | Youthful | 100/ WAE1 = 0.4 | 15/ WAE2 = 0.4 | 0/ WAE3 = 0.2 |
|  | Shape and volume | 0/ WAE1 = 0.1 | 90/ WAE2 = 0.8 | 1/ WAE3 = 0.1 |

Therefore, the light controller may be adapted to determine a desired aesthetic effect by detecting a user input and selecting a predefined aesthetic model based on the detected user input. The aesthetic model selected includes values and aesthetic factor weights associated with one or more of the aesthetic factors that may be adjusted to achieve the desired aesthetic effect.

Undefined Aesthetic Models

Alternatively, if the user specifies an undefined aesthetic effect tag, such as for example "Carnival", the light controller is adapted to perform a machine learning process to determine the relationship between the undefined aesthetic effect and aesthetic factors associated with the aesthetic effect. This process learns from a set of images having the aesthetic effect keyword tagged in its metadata. The light controller extracts aesthetic factors 550 from the set of images and computes an average value for each aesthetic factor in order to develop a new aesthetic model.

The development of a new aesthetic model may include the steps of the light controller determining one or more new data categories (such as an aesthetic effect, for example) and/or values (such as an aesthetic factor, for example) for storage in an aesthetic model. The new aesthetic model may be an aesthetic model that is newly created by the light controller, or may be an existing aesthetic model that is modified by the light controller.

For example, the undefined aesthetic effect selected by the user may be "Carnival". A set of images that include the keyword "Carnival" in data associated with that set of images is extracted from a database. For example, the database may be an online database, or the user's personal database accessible by the light controller. Features, or aesthetic factors, are extracted from the set of images and the light controller calculates average values to define the aesthetic effect as follows:

|  |  | Aesthetic factors | | | |
|---|---|---|---|---|---|
|  |  | Mean chroma (CIELCH) | Mean contrast [0-100] | Number of sources | Diffuseness of sources [0-100] |
| Aesthetic effects | Carnival | 60 | 50 | Undefined | 50 |

In other words, the light controller is adapted to determine a desired aesthetic effect by detecting a user input, determining if a predefined aesthetic model is not stored in the storage device based on the detected user input, and upon a positive determination, developing an aesthetic model that defines the desired aesthetic effect. The aesthetic model comprises values and weights associated with one or more of the aesthetic factors. Further the light controller may identify one or more aesthetic factors based on one or more images that comprise a tag identifying the one or more images as having the desired aesthetic effect.

Comparison of Initial Image Characteristics and Aesthetic Factors

Figure 7:
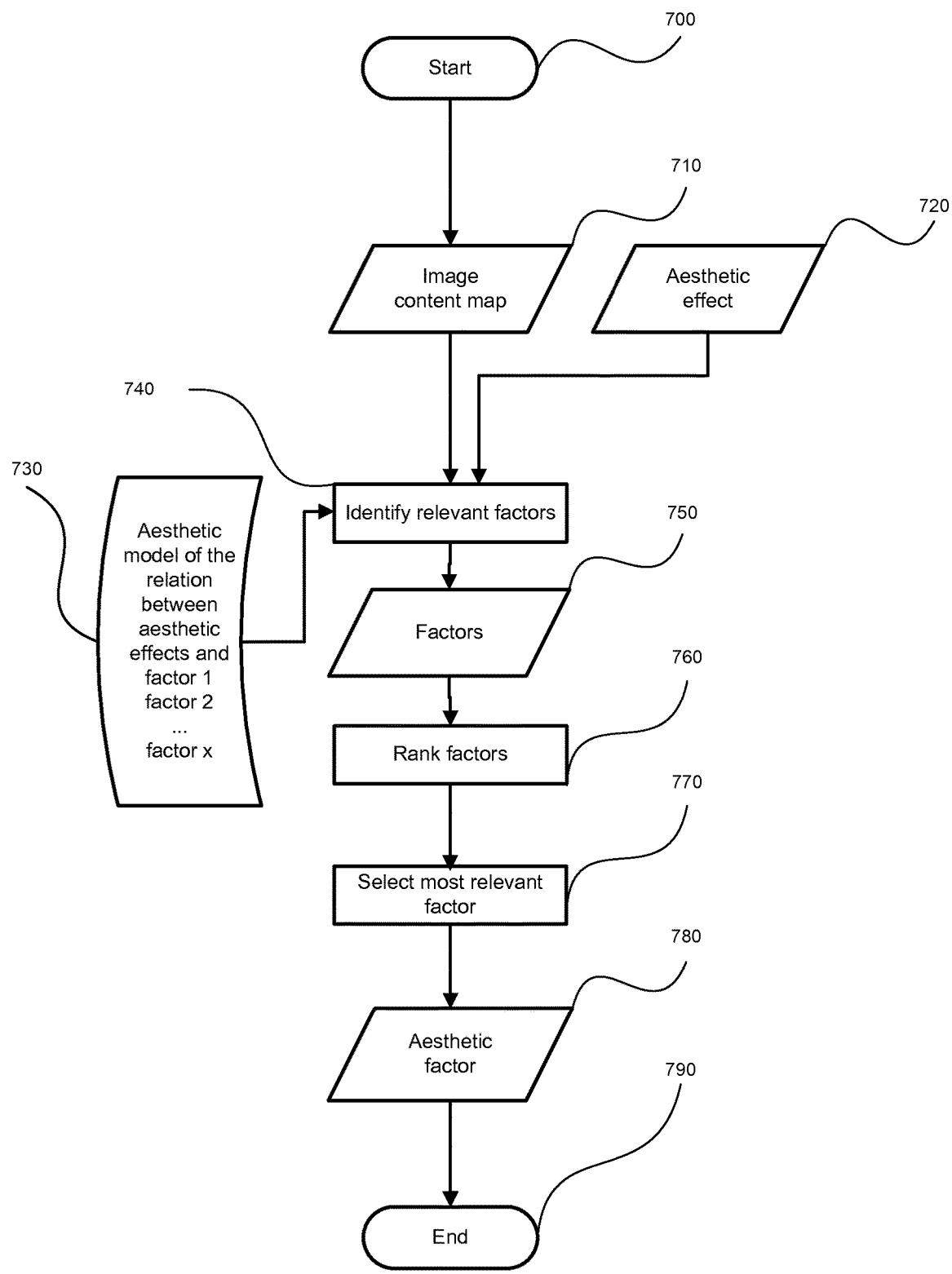
FIG. 7 is a schematic flow diagram illustrating a method of determining an aesthetic factor as used in the method of FIG. 5.

Step 545 is shown in more detail in FIG. 7. At step 545 of the process, the light controller has gathered several key pieces of information:

The initial lighting configuration of each light fixture 505, including the spatial or positional parameters and the light control parameters,
The initial image 520 captured by the camera;
The scene characteristics stored in the image content map 530 obtained from the initial image;
The desired aesthetic effect 540 as selected by the user;
The aesthetic model 547 associated with the desired aesthetic effect;

In step 545 the initial lighting configuration is evaluated and a decision is made whether one or more parameters of the lighting arrangement should be re-configured to achieve the desired aesthetic effect.

Each of the global and local image characteristics stored in the image content map 710 is analysed by the light controller, either individually or in a combination with other characteristics. Further, this analysis may be performed by the light controller either in a sequence or in parallel. Each image characteristic is considered by the light controller when it corresponds to at least one aesthetic factor in the aesthetic model 730 retrieved by the light controller corresponding to the aesthetic effect 720 selected by the user. For example, the light controller determines whether the mean chroma of the scene corresponds to the mean chroma in the aesthetic model using a pre-determined look up table of correspondences between image characteristics and the aesthetic factors in the aesthetic model.

The light controller weights the image characteristic ICi by the scene characteristic weight WSCi. The scene characteristic weight values are in a range [0:2]. For example a scene characteristic weight WSC1 for the white shirt would be below 1, at WSC1=0.5, and a scene characteristic weight for the black shirt would be above 1, at WSC2=1.5. The scene characteristic weights are retrieved from a lookup table associated with the aesthetic model, where the lookup table lists the correspondence between scene characteristics and scene characteristic weights. The weights are applied so that the lighting adjustment is more sensitive to image characteristics in regions of the image which have scene characteristics which causes the relevant lighting parameters to a strong influence on the aesthetic effect.

As a further example, consider a boy wearing a saturated red shirt in a scene when the desired aesthetic effect selected by a user is "Punchy". Due to the scene property of the shirt making the scene naturally punchy (due to the shirt's colour), the scene weight associated with this particular scene property is given a value of less than 1, e.g. WSC1 (i.e. the shirt's scene characteristic weight)=0.5. Therefore, according to this example, the mean chroma of the red shirt area in the image IC1 is high. It can be seen that this high mean chroma value is mainly due to the scene characteristics (the red shirt) more than the light characteristics, and this specificity is captured in the scene weight WSC1.

Before the light controller can evaluate the image characteristics, the light controller modulates IC1 by the scene weight WSC1=0.5, and then compares the resultant value to the targeted mean value for Punchy using the following equation:

$$\text{Delta\_SCj\_AEi} = [ICj \times WSCj] - \text{Target\_AEi}$$

if Delta_SCj_AEi=0 +−−a pre-determined tolerance value, then the light controller considers that the target value is reached, and so determines that no lighting adjustment is necessary.

If the resultant value of Delta_SCj_AEi is calculated to be a value below 0, than the light controller determines that the current image is not punchy enough, and so the light controller is arranged to adjust the light fixtures accordingly to increase how punchy the next image will be when the next image is captured.

If the light controller determines that the calculated value of Delta_SCj_AEi is above 0, then the light controller determines that the current image is too punchy and so is arranged to adjust the light fixtures accordingly to reduce how punchy the next image will be when the next image is captured.

In a different scenario, the same selected aesthetic effect with the same lighting arrangement may be considered. In this scenario, a different scene characteristic may exist, such as a different coloured shirt, for example, a light de-saturated pink. Therefore, in this scenario, WSC would be closer to 1, e.g. WSC1=0.9. Thus the value of Delta_SCj_AE would be affected, and the system might calculate a different result. Therefore, the system is able to adapt to different scene characteristics and control the light fixtures accordingly to adjust future images.

The same comparison may be performed across all image areas, for each aesthetic factor.

Therefore, the light controller is adapted to determine at least one image characteristic from the image content map, and determine a weighting value for the determined image characteristic (i.e. determine an image characteristic weight value) with reference to the at least one scene characteristic.

The light controller compares the weighted image characteristic value to the corresponding aesthetic factor value in the aesthetic model 547, which is based on the desired aesthetic effect selected by the user.

If the light controller determines that the two values are equal, then it further determines that the target for the desired aesthetic effect is met. If the values differ significantly (more than a set threshold, for example 5%), the light controller determines that the target desired aesthetic effect is not met, and further determines that the factor is identified as a relevant factor 740. The light controller then adds the factor to the list of relevant factors 750 to consider in the change of light configuration and stores this information.

Aesthetic Factor Determination

Once all the comparisons have been processed by the light controller, the light controller applies an aesthetic factor weight to each factor according to the factor's relative importance for a particular aesthetic effect. For example, for a "punchy" effect, the mean chroma is more important than other factors and is weighted accordingly with a larger aesthetic factor weight value than other factors. This information is determined by the light controller from data in the aesthetic model.

The aesthetic factor might also be weighted by the light controller according to the scene characteristics.

For example, this may be achieved by the light controller reading a lookup table that stores pre-determined values. This lookup table may store the scene characteristics values and corresponding weights WAE_SC. A set of lookup tables may be predetermined based on expert knowledge and stored in the system for use by the light controller.

For example, in the case of a portrait desired aesthetic effect, the reproduction of skin tone is critical and only a limited gamut of colours should be used to reproduce skin tone in an image. If the light controller determines that the skin tone is outside this limited gamut in the initial image, it is important to address the situation so that the light controller can modify the lighting arrangement accordingly. Therefore, the light controller may set WAE_SC to a value above 1, e.g. 2, and the light controller may assign a greater aesthetic weight, such as newWAE=WAE×WAE_SC to this aesthetic factor.

Therefore, one or more sets of rules may be developed to determine whether and to what extent a greater or different weight is assigned to specific factors.

The light controller ranks the weighted list of candidate aesthetic factors 760. The ranking can be for example from the largest relative difference to the lowest. The top ranked aesthetic factor is selected 770 by the light controller for the next step.

That is, the light controller is adapted to select a plurality of aesthetic factors involving adjustment, determine a plurality of weighting values for the selected aesthetic factors based on the aesthetic factor's association with the desired aesthetic effect, and rank the selected aesthetic factors based on the determined aesthetic factor weighting values.

Degree of Modification and Preference Model

Once the aesthetic factor 550 is determined by the light controller, the degree to which the factor is modified by the light controller is determined 555. A modified aesthetic factor is called an aesthetic factor parameter 565. According to one example, the mathematical difference between the weighted image characteristic value and the corresponding aesthetic factor value as calculated by the light controller provides a good estimation of the degree of modification that is involved to obtain the desired aesthetic effect.

For example if the light controller determines that mean chroma is the aesthetic factor 550 that involves adjustment, the aesthetic factor parameter 565 can be adjusted by the light controller based on the measured difference, i.e. a 20% increase may be applied to the aesthetic factor by the light controller.

Therefore, in accordance with at least one scene characteristic identified in the image content map, the light controller is adapted to select from a plurality of aesthetic factors at least one aesthetic factor involving adjustment in order to achieve the determined desired aesthetic effect for a further image that is to be taken of the scene.

The scene characteristic identified may be a local scene characteristics and the lighting parameter developed for re-configuring the lighting arrangement may be based on local changes to the scene.

Determination of Target Light Characteristics

The initial lighting configuration 505 is analysed by the light controller. Each parameter is analysed, either individually or in a combination with other parameters, either in a sequence or in parallel.

The goal of the analysis is for the light controller to determine whether a given light parameter can be modified to achieve the targeted modification of the selected aesthetic factor associated with the desired aesthetic effect. The light controller determines whether combinations of light parameters may be adjusted. That is, the light controller is adapted to develop at least one lighting parameter for re-configuring the lighting arrangement, wherein the at least one lighting parameter corresponds with at least one aesthetic factor that was selected for adjustment. The light controller may develop lighting parameters by determining data values for the light parameter and storing those values in a storage device.

The light controller may further be adapted to develop a plurality of lighting parameters that correspond with the at least one selected aesthetic factor, and develop a combination of lighting parameters by combining at least two of the developed lighting parameters for re-configuring the lighting arrangement.

To be selected for adjustment by the light controller, the light controller determines whether a light parameter or a combination of light parameters meets the following conditions:

1. The light parameter, or combination of light parameters, must have a significant impact on the selected aesthetic factor. For example, the light parameter position of the source will generally have little impact on the mean chroma. On the other hand, a change of the light parameter colour rendering index will have a much stronger impact on the mean chroma. Relevant light parameters and weights for a given aesthetic factor are provided in the aesthetic model file. Alternatively they are identified in a preliminary calibration step, in which the light parameters are varied, several images are captured and the outcome is analysed to determine the impact of the light parameters on the factors.
2. For example, after a first image capture, the position of the source parameter may be varied. A second image is subsequently captured. The values of the different aesthetic factors for the two images may then be compared by the light controller, and the relative impact of this parameter on the aesthetic factors may be ranked by the light controller and subsequently stored.

After the light controller has performed this calibration step for all light parameters and all aesthetic factors, the stored information may be retrieved and ranked by the light controller to determine the ranking of the change in light parameters for each aesthetic factor. Based on this, the light controller determines that the top ranking light parameters have a significant impact on the selected aesthetic factor.

3. The degree of modification needed must be within the range available for the given light configuration For example, if the colour rendering index is considered, the modification needed must be within the range that the light fixture can produce based on the light fixture settings stored and available to the light controller.

In certain situations the value of the light configuration change is easily determined by the light controller from the aesthetic factor parameter. For example if the scene is too dark by 20%, the change of light power for the light controller to apply is also 20%.

In other situations the exact value of the light configuration change is difficult to determine by direct comparison between the aesthetic factor parameter and light parameter. For example, an increase of colour rendering index of the light fixtures will result in an increase of the mean chroma, but the exact mathematical relationship is unknown. According to one example, an iterative search may be performed by the light controller. That is, the light controller may be adapted to perform a gradient descent search to achieve the desired change in chroma.

When several light parameters and/or combinations of light parameters can be modified to achieve the desired degree of modification, the preferred resulting light configuration may be determined by the light controller using a preference model 560.

Prior art methods to quantify observer preference fail to perform well in many circumstances. One reason for this failing is the fact that prior art methods attempt to represent observer preference as a "preference score" comprising a single value. Often this score is compared to the results of psychophysical experiments where observers are asked to assign preference scores to a set of images with different transforms applied to each image. The preference scores are then averaged on a per-image or per-transform basis in order to produce mean preference scores comprising a single value. Performance of the above methods is then judged relative to how well they predict these mean preference scores.

A flaw in this approach is that mean preference scores comprising a single value do not adequately represent the complexity of human behaviour in regard to preference for images. Preference scores assigned by people often differ greatly from the mean preference scores for a population due to individual variation. Some people will greatly prefer a transformed image that others will find objectionable. The prior methods cannot capture the richness of this information and make use of it in useful ways.

Figure 10A:
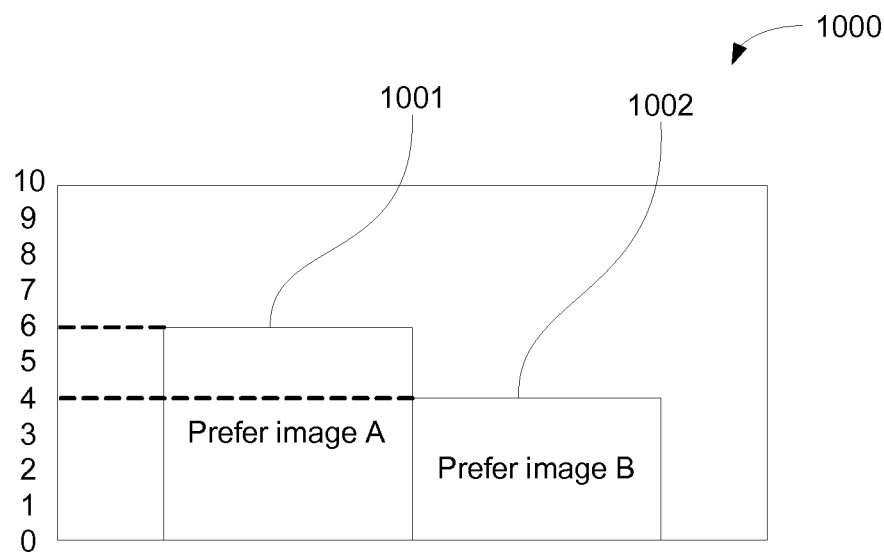
FIGS. 10A and 10B show how prior art systems have one degree of freedom when determining user preferences, while Multiple degree-of-freedom (MDOF) arrangements have two or more degrees of freedom.

Typically, prior art methods determine a single preference, for example whether observers prefer an image A or an image B. This approach is depicted in FIG. 10A which depicts results 1000 of an experiment showing that 60% of observers prefer image A (see 1001), and 40% prefer image B (see 1002). The depicted preferences have one degree of freedom, because only one of the preferences can be established independently, while the other preference is defined by the fact that the sum of the preferences needs to add up to 100%. Thus if 1001 is 60%, then 1002 must be 40% to add up to 100%. Therefore, although this arrangement appears to determine two preferences, it actually only determines one preference independently, because the other preference is then fixed by the fact that the sum of the preferences needs to add up to 100%.

In contrast, the Multiple degree-of-freedom (MDOF) method provides a preference model that determines a plurality of preferences, not just one as in the prior art. MDOF methods provide a more comprehensive set of observer preference values than prior art methods, in particular providing observer preference values having a plurality of degrees-of-freedom.

Figure 10B:
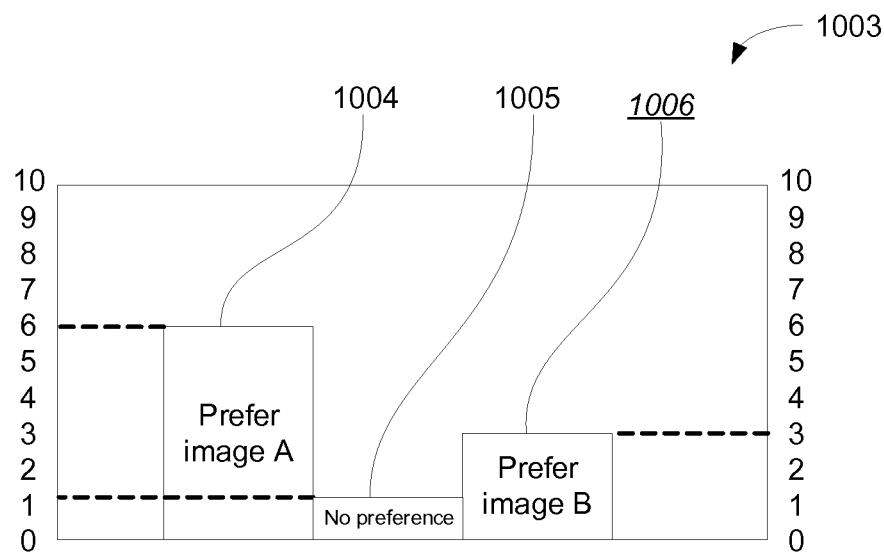

In one simple example 1003 depicted in FIG. 10B observers' preferences are determined for three cases, namely (a) prefer image A (i.e. 1004), (b) prefer image B (i.e. 1006), or (c) have no preference (i.e. 1005). The depicted preferences have two degrees of freedom, because the arrangement determines two preferences independently while the third preference is then fixed by the fact that the sum of the preferences needs to add up to 100%. Although the sum of the three preferences still needs to add up to 100%, two of the three preferences can thus be established independently. Therefore, if 1001 is 60%, and 1006 is 30% then 1005 must be 10% so that the three preferences add up to 100%. Although FIG. 10B depicts a two degree of freedom MDOF arrangement, the MDOF arrangement is not limited to this example and can be implemented as an N degree of freedom arrangement where N is any positive integer.

Therefore, the preference 560 is a probabilistic distribution predicting the relation between light parameters and the preference measure, i.e. the judgment of observers. A preference measure is a measure of the degree to which an image will be selected over another image (or other images) based on desirable characteristics. The preference measure measures the degree to which one image is preferred to another based on subjective quality. The "value" of the preference measure is the quantitative value that is determined by the light controller for the measure in question. This might for example be a numerical score of 6 in a possible range of 1-10.

A more detailed description of preference models can be found in co-pending application AU2013273630 entitled Observer Preference Model, which is hereby incorporated in its entirety by reference.

The light controller is adapted to develop a combination of lighting parameters by determining multiple combinations of lighting parameters, determining at least one preference measure that measures the degree to which an image will be selected over another image based on the desired aesthetic effect, determining a relationship between the multiple combinations of lighting parameters and the at least one preference measure, and developing a combination of lighting parameters based on the determined relationship.

When the light controller determines that no adjustments of a light parameter or combination of light parameters can fully achieve the desired degree of modification, the light controller is adapted to select a light parameter or combination of light parameters that result in the nearest degree to the desired degree of modification.

The process may be iterated until the desired aesthetic effect look is achieved. That is, the light controller is adapted to develop at least one lighting parameter for reconfiguring the lighting arrangement by i) developing an initial lighting parameter, ii) re-configuring the lighting arrangement, iii) obtaining a further image of the scene using the re-configured lighting arrangement, iv) developing a further image content map identifying the scene characteristic of at least a part of the scene captured in the further image, v) determining from the further image content map whether one or more aesthetic factors involve adjustment in order to achieve the determined desired aesthetic effect in a subsequent image and vi) repeating steps i) to iv) based on a determination of whether one or more aesthetic factors involve adjustment.

When a light parameter has an impact not only on the aesthetic factor of interest but on others as well, a multivariate convergence algorithm may be used by the light controller to ensure proper convergence of all factors towards the desired aesthetic effect.

A new light configuration 575 is determined 570 by the light controller and applied to the lighting system to achieve the determined aesthetic effect 540. At the end of its internal process, the light controller communicates back to the light fixtures, to request change in the light configuration.

In addition to a change in the light configuration, the system can also access the camera settings and parameters and suggest a change in the camera settings, such as for example the white balance setting.

Alternatively, the light controller may communicate the request to the user who is in charge of manually changing the light configuration.

Once the new light configuration is active, a further image is captured 580 and the process is completed to its end 585.

Figure 6:
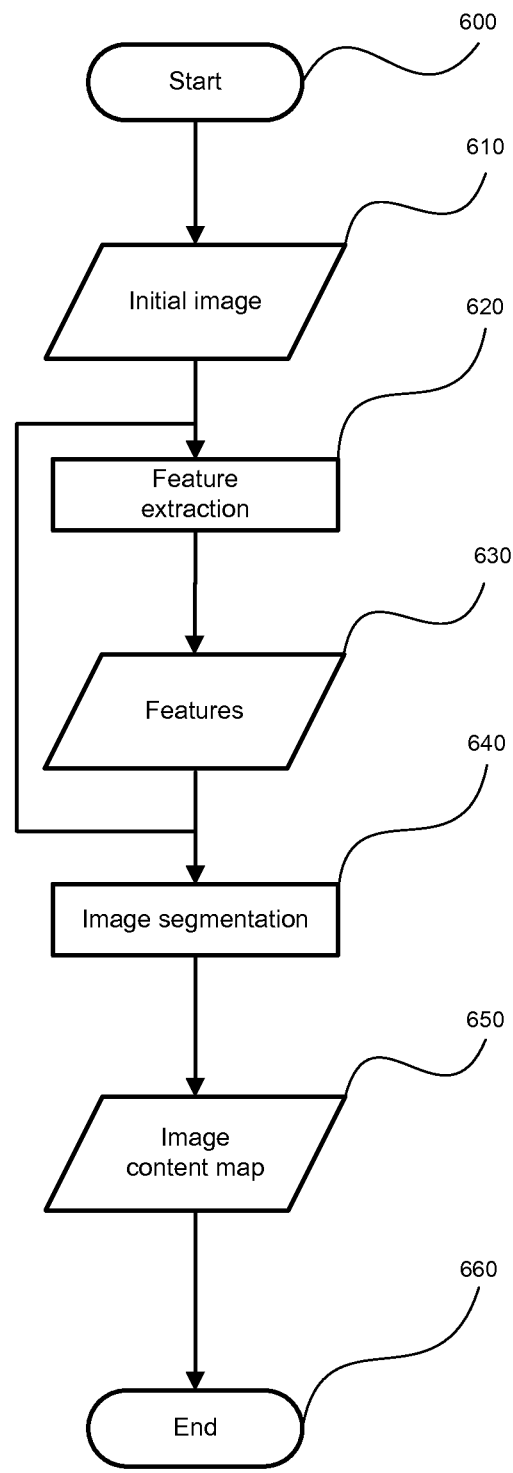
FIG. 6 is a schematic flow diagram illustrating a method of determining an image content map as used in the method of FIG. 5.

FIG. 6 describes how the light controller is adapted to determine the image content map.

The process starts 600 with the initial image 610, from which features are extracted 620 by the light controller. Examples of features 630 that may be extracted include, but are not limited to, local chroma, hue and luminance values, local contrast, local sharpness. Based on these features, the initial image is segmented in 640 by the light controller to produce an image content map 650 and the process is completed to its end 660.

FIG. 7 describes how the light controller determines one or more aesthetic factors.

The process starts 700 with the image content map 710, the aesthetic effect 720 and the aesthetic models 730 from which the relevant factors are identified 740. These factors 750 are ranked in 760 by the light controller and the most relevant factor 780 is selected 770 by the light controller whereupon the process is completed to its end 790.

Figure 8:
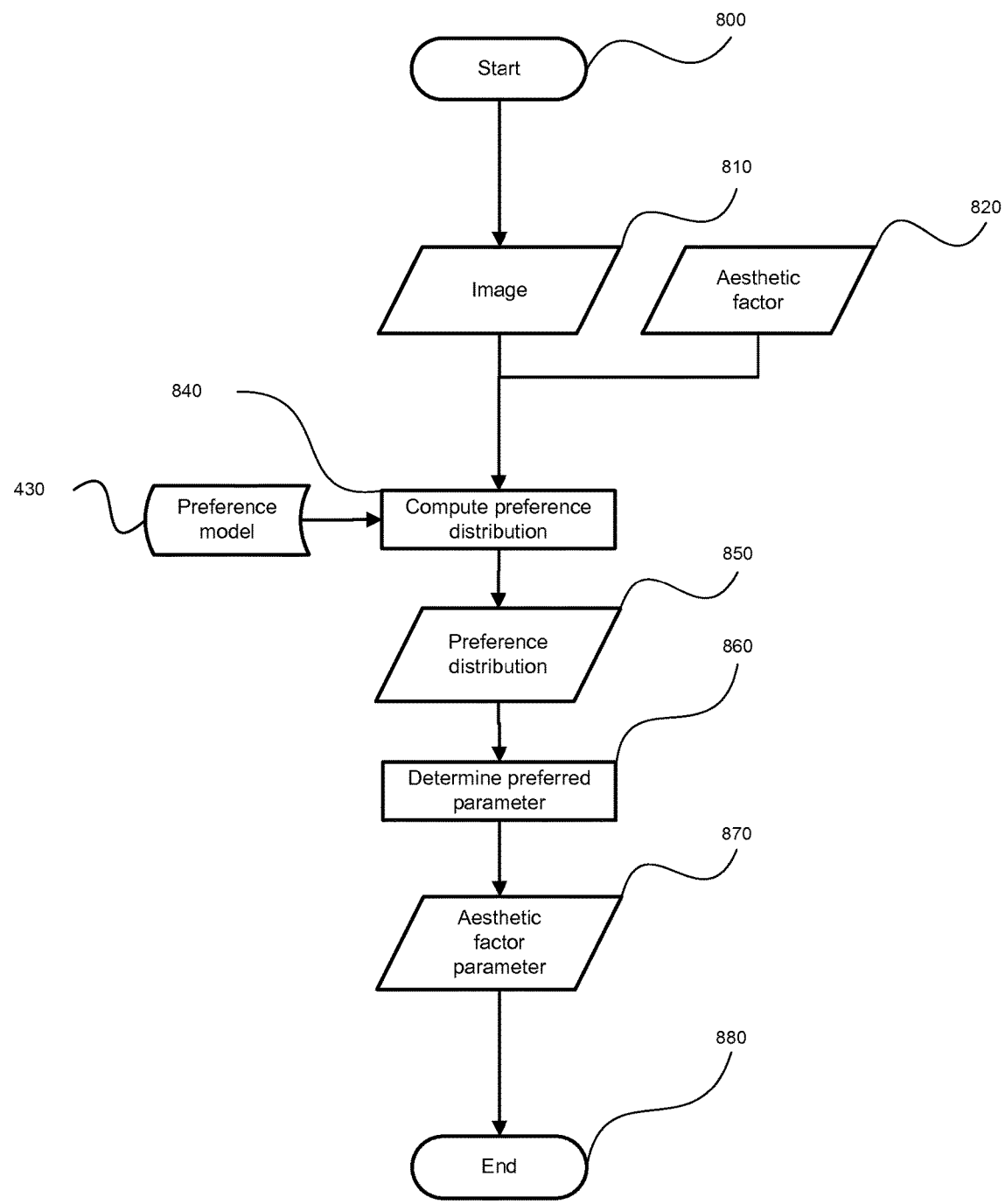
FIG. 8 is a schematic flow diagram illustrating a method of determining an aesthetic factor parameter as used in the method of FIG. 5.

FIG. 8 describes how the light controller determines aesthetic factor parameters The process starts 800 with the image 810, the aesthetic factor 820 and the preference model 830 from which a preference distribution is computed 840 by the light controller. This preference distribution 850 is analysed 860 by the light controller to determine a preferred parameter in 870 and the process is completed to its end 880.

Figure 9:
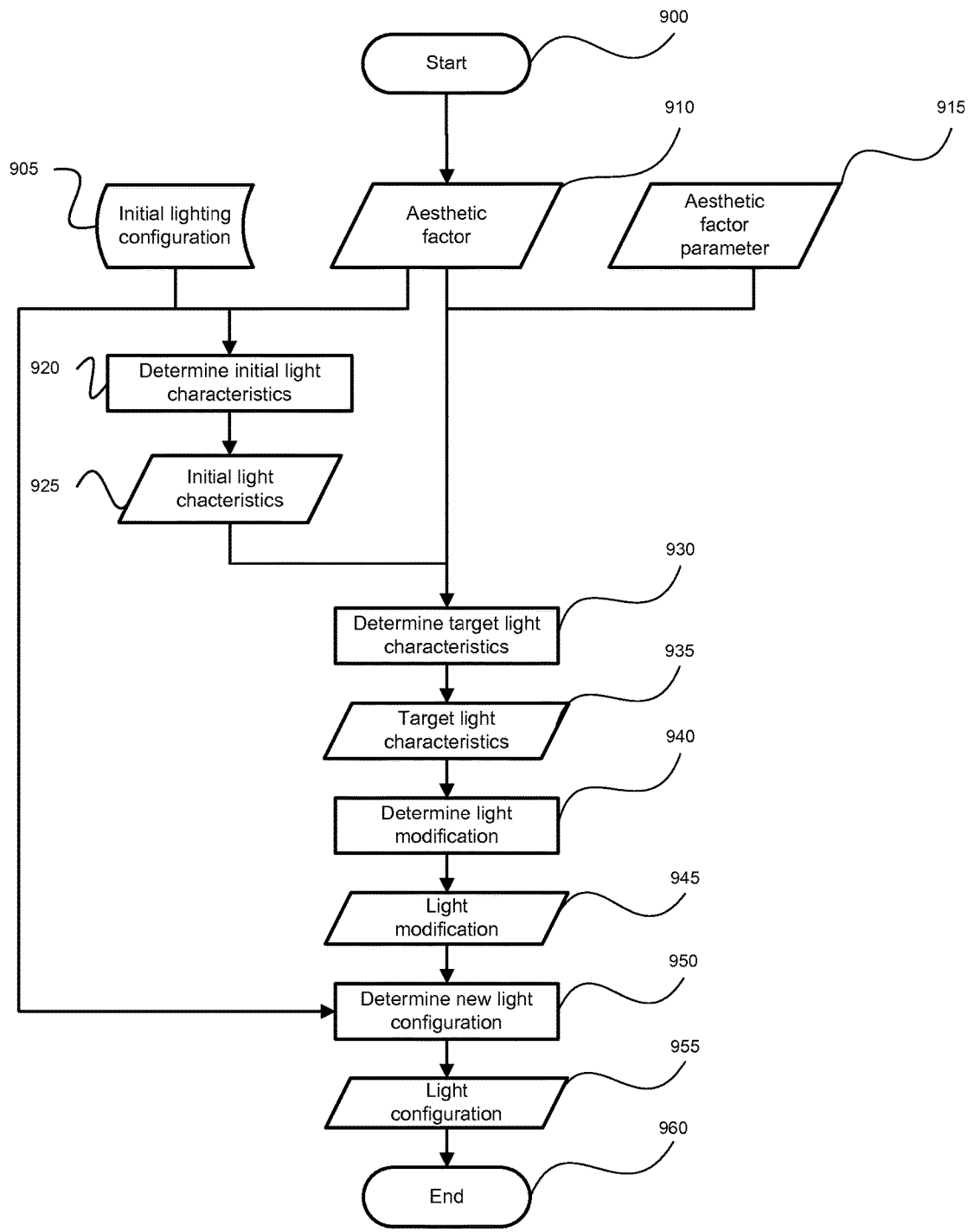
FIG. 9 is a schematic flow diagram illustrating a method of determining a light configuration as used in the method of FIG. 5.

FIG. 9 describes how the light controller determines light configuration.

The process starts 900 with the initial lighting configuration 905 and the aesthetic factor 910 from which initial light characteristics 925 are determined 920 by the light controller. The initial light characteristics 925, the aesthetic factor 910 and the aesthetic factor parameter 915 are then analysed by the light controller to determine target light characteristics 930. The target light characteristics 935 are then used by the light controller to determine light modifications 940. Both the initial lighting configuration 905 and light modification 945 are then used by the light controller to determine the new light configuration 950. The new light configuration 955 is now available and the process is completed to its end 960.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of re-configuring a lighting arrangement used to light a scene which is to be captured by an image capture device, the method comprising the steps of:
    obtaining an initial image of the scene using an initial configuration of the lighting arrangement;
    developing an image content map identifying at least one scene characteristic of at least a part of the scene captured in the initial image;
    determining an effect for a further image to be captured based on the scene;
    in accordance with the at least one scene characteristic identified in the image content map, selecting from a plurality of factors at least one factor involving adjustment in order to achieve the determined effect for the further image;
    determining light modifications for the further image to be captured by analyzing the initial configuration of the lighting arrangement, the effect, and the at least one factor; and
    developing at least one lighting parameter for re-configuring the lighting arrangement based on the determined light modifications,
    wherein selecting the at least one factor involving adjustment comprises determining a plurality of weighting values for the selected factors based on the factor's association with the effect and ranking the selected factors based on the determined weighting values.

2. The method of claim 1 wherein the step of developing at least one lighting parameter further comprises the steps of:
    developing a plurality of lighting parameters that correspond with the at least one selected factor; and
    developing a combination of lighting parameters by combining at least two of the developed lighting parameters for re-configuring the lighting arrangement.

3. The method of claim 1 further comprising the steps of:
    selecting a configuration of the lighting arrangement from one or more use-case specific predetermined lighting configurations;
    identifying an initial configuration file associated with the selected configuration; and
    developing lighting parameters for configuring the lighting arrangement using the initial configuration file so that the initial configuration of the lighting arrangement corresponds with the selected configuration.

4. The method of claim 1 further comprising the steps of:
    determining the initial configuration of the lighting arrangement by communicating with one or more light fixtures arranged to light the scene; and
    obtaining lighting parameters associated with the one or more light fixtures.

5. The method of claim 1 further comprising the steps of:
    obtaining initial lighting parameters based on the initial configuration;
    obtaining the at least one scene characteristic from the image content map;
    determining the contribution of the at least one scene characteristic to the image of the scene;
    determining the contribution of the initial lighting parameters to the image of the scene; and
    developing one or more extracted scene characteristics by separating the contribution of the at least one scene characteristic from the contribution of the initial lighting parameters.

6. The method of claim 1, wherein the step of determining an effect comprises the step of detecting a user input and selecting a model based on the detected user input, wherein the model comprises values and weights associated with one or more of the plurality of factors.

7. The method of claim 1, wherein the step of determining an effect comprises the steps of:
    detecting a user input;
    determining if a model is not stored based on the detected user input, and upon a positive determination; and
    developing a model that defines the effect based on one or more images that comprise a tag identifying the one or more images as having the effect, wherein the model comprises values and weights associated with one or more of the factors.

8. The method of claim 1 further comprising the steps of:
    determining at least one image characteristic from the image content map; and
    determining a weighting value for the at least one determined image characteristic with reference to the at least one scene characteristic.

9. The method of claim 1 wherein the step of developing at least one lighting parameter comprises the steps of:
    i) developing an initial lighting parameter;
    ii) re-configuring the lighting arrangement;
    iii) obtaining a further image of the scene using the re-configured lighting arrangement;
    iv) developing a further image content map identifying the scene characteristic of at least a part of the scene captured in the further image;
    v) determining from the further image content map whether one or more factors involve adjustment in order to achieve the determined effect in a subsequent image; and
    vi) repeating steps i) to iv) based on a determination of whether one or more factors involve adjustment.

10. The method of claim 1 wherein the at least one scene characteristic identified is a local scene characteristic and the at least one lighting parameter is developed for re-configuring the lighting arrangement based on local changes to the scene.

11. The method of claim 1 wherein the effect is defined by an image characteristic comprising at least one of saturation, colour gamut, hue contrast, mean hue, tonal range, global contrast, global brightness, image composition, sharpness, scene depth, depth of field ratio, shadow, and modulation of light.

12. The method of claim 1, wherein the effect is defined by a lighting arrangement characteristic comprising at least one of spatial distribution, spectrum, colour temperature, colour rendering index, power, spatial position, angular range, diffuseness, direction, and luminosity.

13. The method of claim 2 wherein the step of developing a combination of lighting parameters further comprises the steps of:
    determining multiple combinations of lighting parameters;
    determining at least one preference measure that measures the degree to which an image will be selected over another image based on the effect;

determining a relationship between the multiple combinations of lighting parameters and the at least one preference measure; and developing a combination of lighting parameters based on the determined relationship.

14. A light controller adapted to re-configure a lighting arrangement used to light a scene which is to be captured by an image capture device, the light controller adapted to:

obtain an initial image of the scene using an initial configuration of the lighting arrangement;

develop an image content map identifying at least one scene characteristic of at least a part of the scene captured in the initial image;

determine an effect for a further image to be captured based on the scene;

in accordance with the at least one scene characteristic identified in the image content map, select from a plurality of factors at least one factor involving adjustment in order to achieve the determined effect for the further image;

determine light modifications for the further image to be captured by analyzing the initial configuration of the lighting arrangement, the effect, and the at least one factor; and develop at least one lighting parameter for re-configuring the lighting arrangement based on the determined light modifications, wherein the light controller adapted to select the at least one factor involving adjustment comprises determining a plurality of weighting values for the selected factors based on the factor's association with the effect and ranking the selected factors based on the determined weighting values.

15. The light controller of claim 14 further adapted to:

select a configuration of the lighting arrangement from one or more use-case specific predetermined lighting configurations;

identify an initial configuration file associated with the selected configuration; and develop lighting parameters for configuring the lighting arrangement using the initial configuration file so that the initial configuration of the lighting arrangement corresponds with the selected configuration.

16. The light controller of claim 14 further adapted to:

determine the initial configuration of the lighting arrangement by communicating with one or more light fixtures arranged to light the scene; and obtain lighting parameters associated with the one or more light fixtures.

17. The light controller of claim 14 further adapted to:

obtain initial lighting parameters based on the initial configuration;

obtain the at least one scene characteristic from the image content map;

determine the contribution of the at least one scene characteristic to the image of the scene;

determine the contribution of the initial lighting parameters to the image of the scene; and develop one or more extracted scene characteristics by separating the contribution of the at least one scene characteristic from the contribution of the initial lighting parameters.

18. The light controller of claim 14, wherein the light controller is adapted to determine an effect by detecting a user input and selecting a model based on the detected user input, wherein the model comprises values and weights associated with one or more of the plurality of factors.

19. The light controller of claim 14, wherein the light controller is adapted to determine an effect by:

detecting a user input;

determining if a model is not stored based on the detected user input, and upon a positive determination; and developing a model that defines the effect based on one or more images that comprise a tag identifying the one or more images as having the effect, wherein the model comprises values and weights associated with one or more of the factors.

20. The light controller of claim 14 further adapted to:

determine at least one image characteristic from the image content map; and determine a weighting value for the at least one determined image characteristic with reference to the at least one scene characteristic.

21. The light controller of claim 14 wherein the light controller is further adapted to develop at least one lighting parameter by:

developing a plurality of lighting parameters that correspond with the at least one selected factor; and developing a combination of lighting parameters by combining at least two of the developed lighting parameters for re-configuring the lighting arrangement.

22. The light controller of claim 14 wherein the light controller is further adapted to develop at least one lighting parameter by:

i) developing an initial lighting parameter;

ii) re-configuring the lighting arrangement;

iii) obtaining a further image of the scene using the re-configured lighting arrangement;

iv) developing a further image content map identifying the scene characteristic of at least a part of the scene captured in the further image;

v) determining from the further image content map whether one or more factors involve adjustment in order to achieve the determined effect in a subsequent image; and vi) repeating steps i) to iv) based on a determination of whether one or more factors involve adjustment.

23. The light controller of claim 14 wherein the at least one scene characteristic identified is a local scene characteristic and the at least one lighting parameter developed for re-configuring the lighting arrangement is based on local changes to the scene.

24. The light controller of claim 14, wherein the effect is defined by an image characteristic comprising at least one of saturation, colour gamut, hue contrast, mean hue, tonal range, global contrast, global brightness, image composition, sharpness, scene depth, depth of field ratio, shadow, and modulation of light.

25. The light controller of claim 14 wherein the effect is defined by a lighting arrangement characteristic comprising at least one of spatial distribution, spectrum, colour temperature, colour rendering index, power, spatial position, angular range, diffuseness, direction, and luminosity.

26. The light controller of claim 21 wherein the light controller is further adapted to develop a combination of lighting parameters by:

determining multiple combinations of lighting parameters;

determining at least one preference measure that measures the degree to which an image will be selected over another image based on the effect;

determining a relationship between the multiple combinations of lighting parameters and the at least one preference measure; and developing a combination of lighting parameters based on the determined relationship.

* * * * *